US010346657B1

(12) United States Patent
White et al.

(10) Patent No.: US 10,346,657 B1
(45) Date of Patent: Jul. 9, 2019

(54) RFID SYSTEM WITH ANTENNA INTEGRATED IN A LUMINAIRE

(71) Applicant: ABL IP HOLDING LLC, Conyers, GA (US)

(72) Inventors: Sean P. White, Reston, VA (US); Nathaniel W. Hixon, Arlington, VA (US); Niels G. Eegholm, Columbia, MD (US); Youssef F. Baker, Arlington, VA (US); Yenpao Lu, Cumming, GA (US); Jack C. Rains, Jr., Herndon, VA (US); David P. Ramer, Reston, VA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

(21) Appl. No.: 15/866,782

(22) Filed: Jan. 10, 2018

(51) Int. Cl.
*G06K 7/10* (2006.01)
*H05B 37/02* (2006.01)
*G07C 9/00* (2006.01)

(52) U.S. Cl.
CPC ..... *G06K 7/10445* (2013.01); *G06K 7/10099* (2013.01); *G07C 9/00111* (2013.01); *H05B 37/0272* (2013.01)

(58) Field of Classification Search
CPC .......... G06K 7/10445; G06K 7/10099; G07C 9/00111; H05B 37/0272
See application file for complete search history.

(56) References Cited

U.S. PATENT DOCUMENTS

| | | | |
|---|---|---|---|
| 6,903,656 B1* | 6/2005 | Lee | G06K 7/0008 340/10.1 |
| 7,327,251 B2 | 2/2008 | Corbett, Jr. | |
| 7,551,089 B2 | 6/2009 | Sawyer | |
| 8,497,776 B2* | 7/2013 | Stern | G08B 13/2402 235/385 |
| 2008/0278329 A1* | 11/2008 | Kim | H04B 5/0062 340/572.4 |
| 2009/0102610 A1* | 4/2009 | Lance | G06K 7/0008 340/10.2 |
| 2013/0063317 A1 | 3/2013 | Jonsson et al. | |
| 2013/0241699 A1* | 9/2013 | Covaro | G06K 7/10009 340/10.1 |
| 2016/0092704 A1 | 3/2016 | Russell | |

FOREIGN PATENT DOCUMENTS

WO    2016172236 A1    10/2016

* cited by examiner

*Primary Examiner* — Leon Flores
(74) *Attorney, Agent, or Firm* — RatnerPrestia

(57) ABSTRACT

A lighting system includes luminaires each having a light source for providing illumination in a space and a radio frequency identification (RFID) antenna. An RFID reader is coupled to the RFID antennas in all the luminaires. The RFID reader may transmit at least one RFID intended recipient message from at least one of the antennas and receive a responsive RFID reply message from a recipient device within the space via a plurality of the antennas. The RFID reader may determine a signal attribute of a reply message signal received via each receiving antenna. The determined signal attributes of the reply message signals received via antennas and information about locations of the receiving antennas are processed to estimate a position of the recipient device within the space.

23 Claims, 16 Drawing Sheets

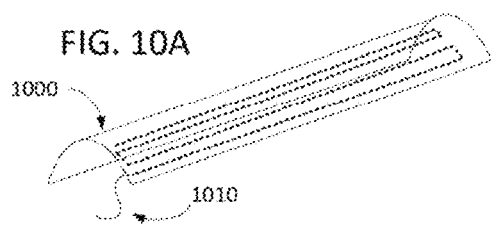
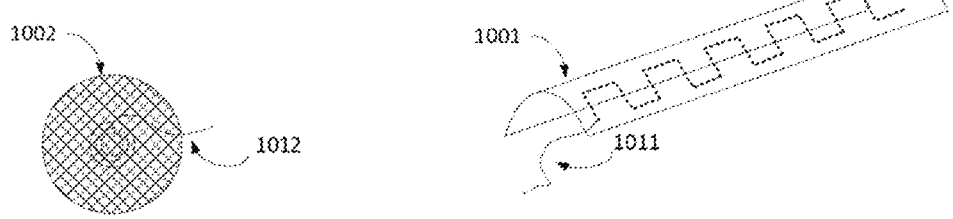
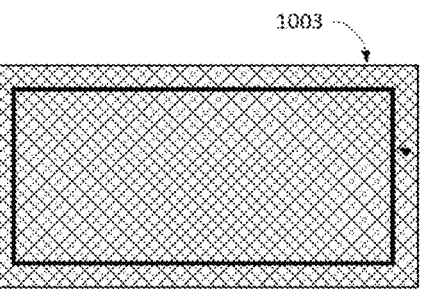
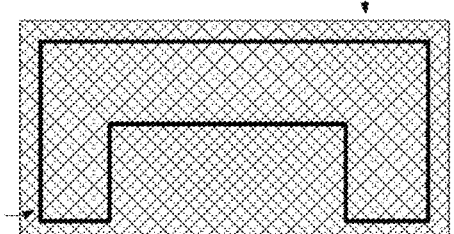
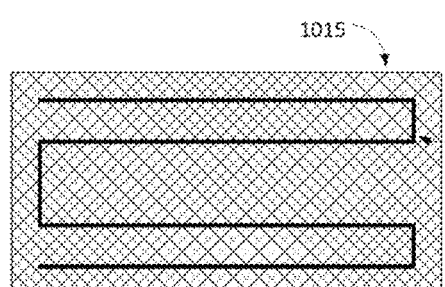
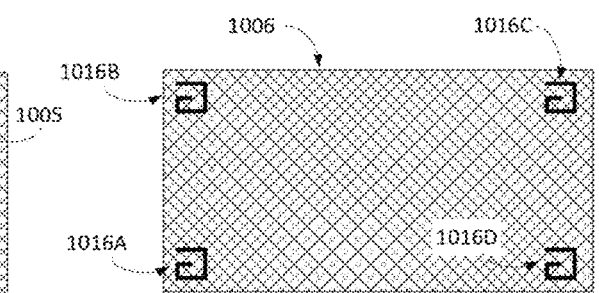

RFID SYSTEM WITH ANTENNA INTEGRATED IN A LUMINAIRE

TECHNICAL FIELD

The subject matter of this application is directed a radio frequency identification detection (RFID) reader coupled to one or more antennas integrated into each respective one or a number of luminaires.

BACKGROUND

As is well known, RFID readers communicate with either passive or active "tags" that respond to signals emitted by respective RFID readers. Systems including the tags and RFID readers have been used for many years to track inventory and items, even persons, in different types of spaces, such as factories, warehouses, retail establishments, hospitals, marathon races, and the like.

As mentioned, the tags may be either passive or active. Passive tags are tags that do not carry a separate power supply, but instead derive their power from the energy of the signals received from RFID readers. Conversely, active tags are tags equipped with separate power supplies, such as batteries, solar cells or the like. An RFID reader may emit a signal that triggers an RFID tag to send back a response signal carrying the identification (ID) associated with the tag. The RFID reader receives the response signal from the tag and captures the tag ID, for further use according to the particular application of the RFID system.

Regardless of whether the tags are passive tags or active tags, RFID readers can be placed in various locations such as walls, light switches, counter tops, door way scanning devices, ceilings, and the like. One device that is ubiquitous in spaces such as the factor, warehouse, retail establishment and hospital are light fixtures.

It has been suggested to incorporate an RFID reader and the antenna required to receive responses from tags in the space in a light fixture, or even into a light bulb. However, these systems require each RFID-enabled light fixture to have both a suitable antenna and an associated RFID reader, which result in systems that are expensive to implement and include redundant devices.

SUMMARY

Hence, there is a need for improvement in the utilization of RFID systems to more accurately and efficiently, through cost reduction and implementation measures, locate equipment for reading RFIDs to perform RFID reader functions in a space.

By way of an example, a lighting system includes luminaires located within a space and a radio frequency identification reader. Each of the luminaires includes a light source and an antenna. The light source may be configured to provide general illumination light to the space. The antenna may be configured for wireless radio frequency communication within the space. The radio frequency identification reader includes a reader processor, a reader radio frequency transceiver, a selectable antenna interface and a data storage. The reader processor controls operation of the radio frequency identification reader. The reader processor is coupled to the reader radio frequency transceiver, the selectable antenna interface and the data storage. The selectable antenna interface is selectively coupled to each antenna of the luminaires within the space. The data storage device stores a unique identifier for each antenna. The reader processor is configured to iteratively perform functions for each respective one or more of the antennas in each of the luminaires, including controlling the selectable antenna interface to selectively couple the respective one or more antennas to the reader transceiver. The reader transceiver is controlled by the processor to transmit an intended recipient message from a selected antenna of the respective one or more antennas for reception by an intended recipient device. The transmitted intended recipient message contains the unique identifier of the selected antenna and an address of the intended recipient device within the space. The processor is configured to, in response to the transmitting of the intended recipient message, receive via at least one of the respective one or more antennas a reply message from the intended recipient device. A signal attribute of the received reply message is obtained. A record is maintained in the data storage device for each iteration. The record includes the obtained signal attribute in association with the unique identifier of the selected antenna and the intended recipient address.

By way of another system example, the disclosure provides luminaires located to provide illumination lighting within a space and a radio frequency identification reader. Each luminaire includes a light source and an antenna. The light source is configured to provide general illumination light to the space. The antenna is configured for wireless radio frequency communication within the space. The radio frequency identification reader includes a reader processor, a reader radio frequency transceiver, a selectable antenna interface, and a data storage. The reader processor is configured to control operation of the radio frequency identification reader. The reader radio frequency transceiver is coupled to the reader processor. The reader transceiver is configured to emit a signal to an antenna selected from the plurality of antennas, and receive reply messages in response to the emitted signal. The selectable antenna interface is coupled to the processor, the reader transceiver, and to each respective antenna of the plurality of luminaires within the space. The selectable antenna interface is configured to be communicatively coupled at least one selected antenna of the antennas to the reader transceiver in response to an antenna selection signal received from the reader processor. Each of the plurality of antennas has a unique identifier. The data storage device stores the unique identifier for each respective antenna. The reader processor is further configured to determine an attribute of the received reply message usable in estimating a location within the space from which the received reply message was transmitted.

Also, disclosed in an example is a radio frequency identifier reader. The radio frequency identifier reader includes a reader processor, a reader radio frequency transceiver, and a selectable antenna interface. The reader processor is configured to control operation of the radio frequency identification reader. The selectable antenna interface is coupled to the processor and to each respective antenna of the antennas located within the space. The reader radio frequency transceiver is coupled to the reader processor and the selectable antenna interface. The reader transceiver is configured to emit a signal from an antenna selected from the antennas, and receive reply messages in response to the emitted signal. The selectable antenna interface configured to, in response to an antenna selection signal received from the reader processor, communicatively couple at least one selected antenna of the antennas to the reader transceiver.

An example of a process is also provided in the disclosure. The process is an iterative process. During an iteration of an iterative process, an available antenna from a number of antennas is selected as a currently active antenna. Each of the plurality of antennas is coupled to a respective luminaire of a number of luminaires located within a space and assigned a unique identifier. The processor, upon selection of the currently active antenna in the current iteration, generates a message containing an address of an intended recipient and a unique identifier of the antenna selected as the currently active antenna. The generated message is transmitted, via a radio frequency (RF) transceiver coupled to the currently active antenna, into the space. A reply message from the intended recipient device is received via the currently active antenna in response to the transmitted message. A reply message attribute of the received reply message is determined. The determined reply message attribute and the unique identifier of the currently active antenna in association with the intended recipient address is stored in memory. Upon completion of the iterative process the memory contains records of a plurality of determined reply message attributes corresponding to each respective antenna. A location within the space is determined from which the received reply message was transmitted based on the determined reply message attribute. Another antenna from the number of antennas is selected to replace the currently active antenna in a next iteration of the iterative process.

Another example provides a lighting system. The lighting system includes luminaries, an RFID reader transceiver and an RFID reader processor. Each luminaire includes a light source configured to provide general illumination in a space and a radio frequency identification (RFID) antenna. The RFID reader transceiver is coupled to the RFID antennas in all the luminaires. The RFID reader processor is coupled to the RFID transceiver. The RFID reader processor is configured to cause the RFID reader transceiver to transmit at least one RFID intended recipient message from at least one of the antennas and to receive a responsive RFID reply message from a recipient device within the space via a plurality of the antennas. The RFID reader processor is further configured to determine a signal attribute of a reply message signal received via each antenna of the number of antennas; and process the determined signal attributes of the reply message signals received via the number of antennas and information about locations of the number of antennas to estimate a position of the recipient device within the space.

In yet another method example, a method is disclosed that provides a radio frequency identification (RFID) transceiver coupled to RFID antennas in a plurality of luminaires in a lighting system that transmits an RFID intended recipient message from at least one antenna in a respective one of the plurality of luminaires. A responsive RFID reply message signal is received from a recipient device within the space via the plurality of the antennas. The RFID processor determines a signal attribute of the reply message signal received via each antenna of the plurality of antennas. The determined signal attributes of the reply message signals received via the plurality of antennas and information about locations of the plurality of antennas are processed. The position of the recipient device within the space is estimated based on the processed signal attributed of the reply message signals and information about locations of the plurality of antennas.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 10A to 10I illustrate examples of various diffusers with associated RFID antennas.

FIG. 12 is a functional block diagram of a computing device that may operate as a backend server, a processor, a computer, a gateway or the like.

DETAILED DESCRIPTION

Figure 1:
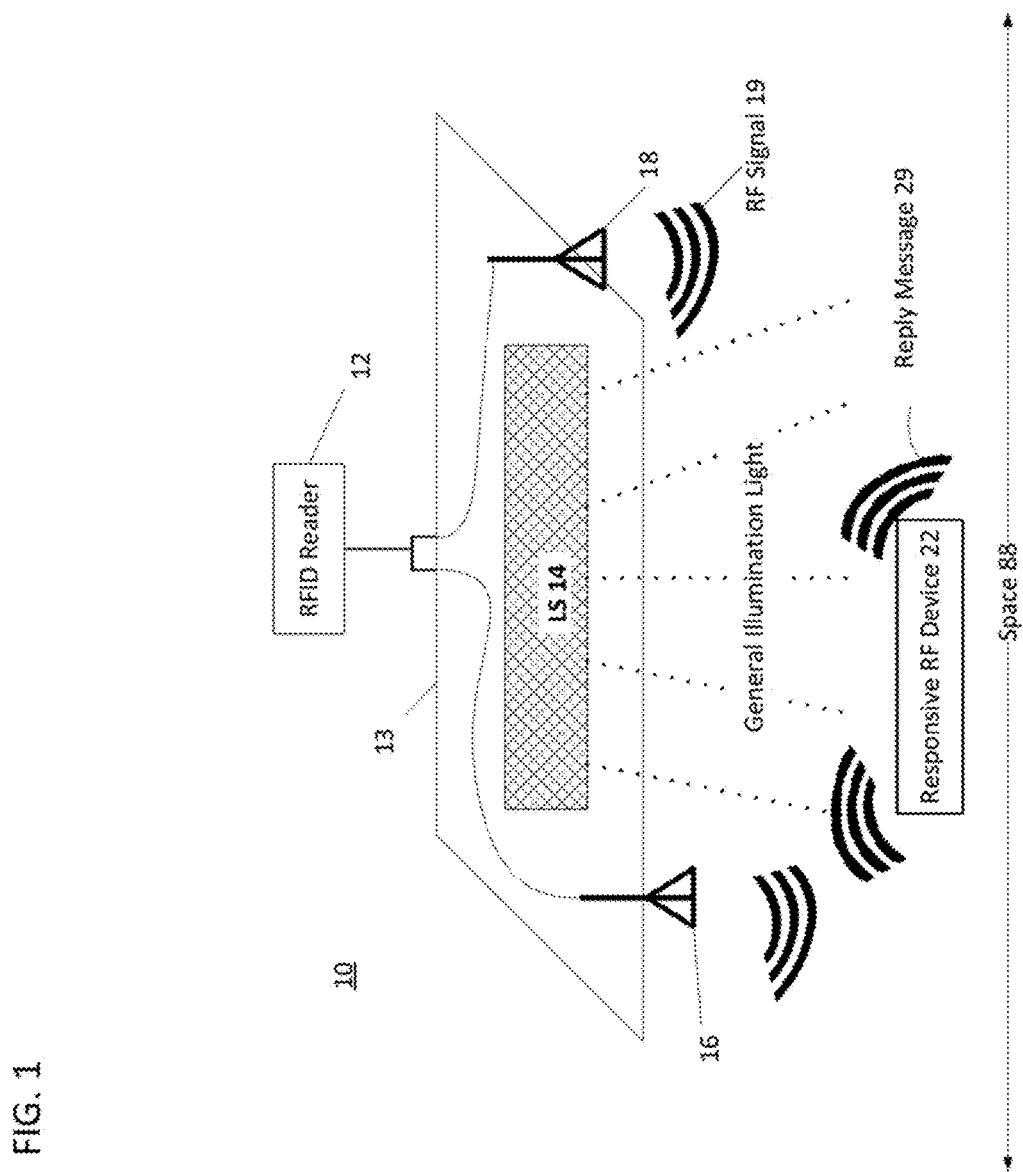
FIG. 1 illustrates an example of a lighting system including a remote RFID reader, a luminaire incorporating a number of RFID antennas that are coupled to the RFID reader, and a responsive device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A need exists for improvement in enabling cost effective and accurate asset tag tracking utilizing a regionalized RFID reader configuration utilizing a distributed set of antennas. Such a regionalized RFID reader covers a larger region in comparison to an ordinary RFID reader and antenna combination. The following discussion explains the structure and function of a regionalized RFID reader configuration that utilizes a central RFID reader coupled to a number of antennas dispersed around the RFID reader, for example, dispersed in one or more luminaires in the general vicinity of the RFID reader, although the circuitry of the reader may be located remotely. The dispersed antennas enable a single RFID reader to emit interrogation signals and receive response messages over a greater area than a single ordinary RFID reader and antenna combination. The dispersed antennas array reduces the power output required to interrogate responsive RF devices over an entire space as compared to a more limited number of antennas, without requiring additional RFID readers. In addition, power for a respective RFID reader may be obtained from a luminaire.

The term "luminaire" as used herein is intended to encompass essentially any type of device that processes generates or supplies light, for example, for general illumination of a space intended for use of or occupancy or observation, by a person or animal. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue.

The term "coupled" as used herein refers to any logical, physical or electrical connection, link or the like by which signals, data, instructions or the like produced by one system element are imparted to another "coupled" element. Unless described otherwise, coupled elements or devices are not necessarily directly connected to one another and may be separated by intermediate components, elements or communication media that may modify, manipulate or carry the signals. For example, system elements may be coupled for wired or wireless communication.

Reference is now made in detail to the examples illustrated in the accompanying drawings and discussed below.

The example of FIG. 1 illustrates a lighting system 10 including a remote RFID reader 12 and a luminaire 13 incorporating a light source LS 14 and a number of RFID antennas 16 and 18. In this example, the light source LS 14 is configured to provide general illumination light to the space in which the luminaire 13 is located. The RFID antennas 16 and 18 are coupled to the RFID reader 12. The RFID antennas 16 and 18 may be monostatic antennas, which means, for example, antenna 16 may be used for transmitting signals and antenna 18 may be used to receive signals. Alternatively, one or both of the antennas 16 and 18 may be bi-static. A bi-static antenna transmits and receives signals. The drawing also shows a responsive RFID device 22. The RFID reader 12 may be configured to transmit and receive radio frequency (RF) signals to from and the RFID antennas 16 and 18 using wired communication channels, wireless communication channels, or both. The RFID reader 12 may output a message that is emitted over-the-air via one or both of antennas 16 and 18 as an RF signal 19. The RFID reader 12 may receive signals from a responsive RF device 22 via one or both of antennas 16 and 18 and the couplings between the reader 12 and the antennas 16, 18.

The responsive RF device 22 may be located in or traversing through the space 88. In this example, the responsive RF device 22 may be configured to respond to RF signals 19 transmitted by the RFID reader 12 by emitting a reply message 29. The reply message 29 may be received by either antenna 16 or 18, or both. The responsive RF device 22 may be a passive RFID tag that is powered by the energy received from RF signal 19. For example, when an antenna (not shown in this example) of responsive RF device 22 receives RF signals, such as 19, form antennas 16, 18 some of the energy in the RF signals is converted by circuitry (described in more detail with reference to FIG. 13) into direct current (DC) electrical power. While only one responsive RF device 22 is shown, multiple responsive RF devices may be powered by the RF energy in the RF signals, such as 19, emitted by antenna 18 and/or 16. For example, the antennas 16 and 18 may emit RF energy omnidirectionally. Hence, at least theoretically, even devices not in the space may be receiving the power. As such, if a single antenna were to emit RF signals, there may be sufficient RF energy in the emitted RF signals to supply power for multiple tags, so increasing the number of antennas should increase the power density. In the examples, the emitted signals may have sufficient power that the received RF energy may supply power to multiple tags from the signals emitted from a single antenna, multiple antennas to a single tag or any variation thereof. Alternatively, the responsive RF device 22 may be an active RFID tag that includes a suitable power source.

In this example, the RFID reader 12 is located remotely from the luminaire 13. In other examples, the RFID reader may be collocated with the luminaire 13, for example, by being incorporated into a housing, or otherwise, integrated into the luminaire 13.

The antennas 16 and 18 are configured for wireless radio frequency communication within the space 88 and may be specifically adapted (e.g. sized and shaped) for effective wireless communication at the frequency or frequencies used for the RFID functions. In addition to the sizing and shape of the antennas 16 and 18, the spacing of the antennas with respect to one another and the respect to the housing of the light fixture may also be considered. For example, the spacing of the antennas may be dependent on the metallic characteristics of the fixture, and may be considered when multiple antennas are within a fixture. Since some RFID systems can resolve distances to approximately 10 cm, it may be more optimal to space the antennas 16 and 18 at least approximately 10 cm apart. In addition or alternatively, a metal housing of a lighting fixture may be used to the benefit of the respective antenna depending upon the characteristics (e.g., curvature) of the housing at or near the location of the respective antenna 16 and/or 18.

The space 88 may be an indoor location, such as a factory, a warehouse, a restaurant, an arcade, a retail establishment, an office, a school, a hospital, an outdoor location, such as a parking lot, amusement park, a carnival game area, or a combined indoor/outdoor location, such as an amphitheater, big-box garden center or the like.

At a high level, the RFID reader transmits an RFID intended recipient message from at least one of the antennas 16, 18 and receives a responsive RFID reply message from a device 22 within the space 88 via some or all of the antennas 16, 18. The RFID reader 12 determines a signal attribute of each reply message signal received via one of the antennas 16, 18. The determined signal attributes of the reply message signals received via the antennas 16, 18 and information about locations of the receiving antennas 16, 18 are processed to estimate a position of the device 22 within the space 88. Examples of signal attributes may include received signal strength, angle of arrival, angle of departure, signal phase, time of arrival, time of departure, or the like.

Additional details of the system 10 operation and details of the RFID reader 12 and responsive RF device 22 are described with reference to the examples of FIGS. 2-4, 6 and 10. It may be appropriate at this time to discuss an example of an RFID reader suitable for use with a lighting system incorporating antennas at different separated locations relative to the space within which the system will estimate the position of a particular responsive RFID device.

Figure 2:
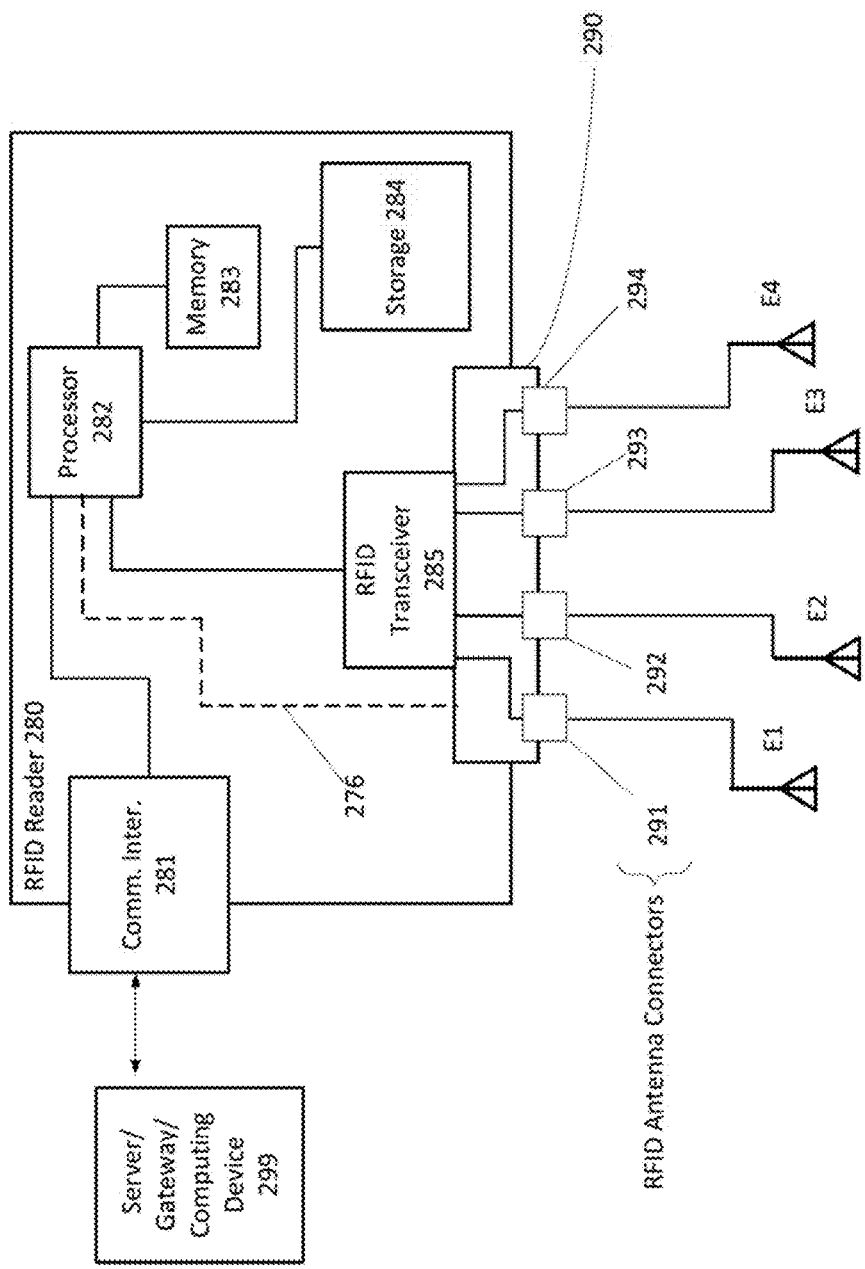
FIG. 2 illustrates a functional block diagram example of an RFID reader usable in a lighting system, such as the lighting system examples of FIGS. 1, and 3-5.

FIG. 2 illustrates a functional block diagram example of an RFID reader 280 usable in a lighting system, such as the lighting system examples of FIGS. 1 and 3-5. The RFID reader 280 in this example includes a reader processor 282, a memory 283, an additional data storage device 284, a communication interface (labeled "comm. inter.") 281, an RFID reader transceiver 285, and a selectively controllable antenna interface 290.

The reader processor 282 is coupled to each of the memory 283, the data storage 284, the communication interface 281, the RFID reader transceiver 285, and the antenna interface 290. An example of the RFID reader processor 282 may include a data communication interface or input/output (I/O) for packet data communication. The processor may be a central processing unit (CPU), in the form of circuitry forming one or more processors, for executing program instructions. The processor hardware typically includes an internal communication bus, and program and/or data storage for various programs. In addition, or alternatively, the processor 282 may include couplings to the communication interface 281 for communication with a computing device, such as 229; and communication ports to the RFID transceiver 285 and/or the selectively controllable antenna interface 290. The foregoing processor 282 description is provided by way of example and is not intended to be the only configuration envisioned. Of course, other configurations and circuitry may be used to implement the functions and operations of the disclosed examples.

The reader processor 282 of FIG. 2 is configured to control operation of the radio frequency identification reader 280, for example, based on executable software or firmware program code. Although the reader processor 282 may be a separate circuit (e.g. a microprocessor), in many cases, it is feasible to utilize the central processing unit (CPU), communication interface and associated memory and data storage of a micro-control unit (MCU) integrated together as a system on a chip (SOC), as the elements 282, 281, 283 and 284 shown in FIG. 2. More recently, the SOC chip may also incorporate transmitter and receiver circuity forming a wireless transceiver, such as the RFID transceiver 285. Such an SOC with the transceiver can implement the wireless communication functions as well as the intelligence of the RFID reader 280.

The antennas E1-E4 may be configured to receive RF signals in the frequency ranges, such as 900-930 MHz or the like. The antennas E1-E4 may be individually located in respective luminaires (not shown in this example), or may be paired in respective luminaires (as shown in the examples of FIGS. 1, and 3-6.

The reader processor 282 may, for example, be configured to perform signal processing of signals received via the antenna interface 290 as well as being configured to control operation of the various components and perform the various functions of the RFID reader 280 described herein. Programming instructions of the reader processor 282 may be stored in the memory 283 or may be implemented in firmware (not shown) of, or coupled to, the processor 282. In addition, the memory 283 or the data storage 284 may be configured to maintain records of determined reply message attributes corresponding to signals received by each respective antenna. For example, a record in memory 283 or data storage 284 may contain determined attributes of reply messages corresponding to each respective antenna, such as antennas 16 and 18 of FIG. 1.

The antenna interface 290 is coupled to the RFID reader transceiver 285, and is also selectively coupled to each antenna of the plurality of luminaires (not shown in this example) within the space. In some examples, the antenna interface 290 may be a controllable switch coupled to the processor 282 via a control signal path 276 that is configured to respond to a selection signal from the processor 282 to select an antenna for signal transmission and/or reception. Alternatively, the antenna interface 290 may be configured as an integrated component of the RFID transceiver 285. In such a configuration, the processor 282 may send an antenna selection signal to the RFID transceiver 285 either separately or as part of a data packet that includes the signals for transmission or instructions to receive signals. For example, the processor 282 interacts via the RFID transceiver 285 with the antenna interface 290 to select an antenna for signal transmission and/or reception. The antenna interface 290 may include a number of RFID antenna connectors, such as 291, 292, 293, and 294, and circuitry and/or a mechanism that enables selection of a respective antenna, such as E1, E2, E3 or E4, located at/in one or more luminaires (not shown in this example) within the space illuminated by the particular lighting system. For example, the antenna interface may, in response to control signals, such as an antenna selection signal, received from the reader processor 282, select a particular RFID antenna connector for coupling an antenna, such as, for example, E1, to the RFID reader transceiver 285. Upon coupling the particular RFID antenna connector to the RFID reader transceiver 285, at the least one selected antenna, such as E1, of the antennas E1-E4 is communicatively coupled to the reader transceiver 285. The RFID reader transceiver 285 may be coupled to the RFID antennas in all the luminaires (not shown in this example) via the antenna interface 290. The antennas E1-E4 may be associated with individual luminaires, or may be coupled in pairs, such as antennas E1, E2 in one luminaire and antennas E3, E4 in another luminaire. The antennas E1-E4 may be monostatic or bi-static. Alternatively, the antennas E1-E4 may be multi-static, in which case, the collocated antennas E1-E4 may provide greater signal strength determination accuracy and improved localization of a responsive RF device (not shown in this example). In the example of FIG. 2, only four connectors 291-294 are shown but the antenna interface 290 may be configured with more or less connectors, and the processor 282 may also be configured to selectively switch between the more or less connectors.

The data storage device 284 may be configured to store the unique identifier for each respective antenna of the number of antennas. The data storage device 284 may be a hard disk drive (HDD), a solid-state memory device (SSD), a flash memory or erasable electronic programmable read only memory (EEPROM) or the like.

The communication interface 281 is configured to enable the reader processor 282 to communicate with a server, gateway and/or other computing device 299 via wired or wireless connections. For example, the communication interface 281 may be coupled to a communication media in compliance with one or more communication protocols and/or specifications, such as EPC Radio-frequency Identity Protocols Generation 2 UHF RFID, Ethernet, Bluetooth, Wi-Fi, ZigBee and/or the like. As described in other examples, the server, gateway and/or computing device 299 may provide services, such as location determination services, asset tag identification services, inventory management services, mapping services or the like. For example, the computing device 299 may forward messages to the RFID reader 280 that are converted to packets for transmission as messages or signals, such as an RFID intended recipient message or the like.

The reader radio frequency transceiver 285 may be configured to emit a radio frequency signal (within a specific range, such as approximately 30 kHz-300 kHz, 3-30 MHz, or 300 MHz-3 GHz, or another frequency range depending upon the application) from an antenna selected from the plurality of antennas, and receive reply messages (also within the approximate frequency ranges of approximately 30 kHz-300 kHz, 3-30 MHz, or 300 MHz-3 GHz) in response to the emitted signal.

The reader processor 282 may be configured to control operation of the radio frequency identification reader 280. For example, the RFID reader processor 282 may be configured to cause the RFID reader transceiver to transmit at least one RFID intended recipient message from at least one of the antennas (described in more detail with reference to another example) and to receive, via one or more of the RFID antenna connectors 291-294, a responsive RFID reply message from a recipient device (described in more detail with reference to another example) within the space via a plurality of the antennas.

The RFID reader processor 282, may for each antenna coupled to a respective one or more of the RFID antenna connectors 291-294, may control the selectable antenna interface 290 to selectively couple a respective antenna to the reader transceiver 285. The RFID reader processor 282 may also control the reader transceiver to transmit an intended recipient message from the respective one antenna to an intended recipient device. In some examples, the transmitted intended recipient message may contain the unique identifier of the respective one antenna and an address of the intended recipient device within the space, and/or other information. In other examples, the transmitted recipient message may only contain the address of the intended recipient device, or may contain the address of the intended recipient device and/or the other information. In response to the transmitting of the intended recipient message, the RFID processor 282 may receive, via the respective one antenna a reply message from the intended recipient device.

In addition, the RFID reader processor 282 may also be configured to obtain or determine a signal attribute of a reply message signal received via each antenna of the plurality of antennas; and process the obtained or the determined signal attributes of the reply message signals received via the plurality of antennas and information about locations of the plurality of antennas to estimate a position of the recipient device within the space. Examples of the signal determination and processing of the determined signal attributes of the replay message are described with reference to other figures such as FIGS. 6-9.

The RFID reader processor 282 may maintain a record in the data storage device for each iteration, the record including the obtained signal attribute in association with the unique identifier of the respective one antenna and the intended recipient address. From the records, the RFID reader processor 282 may, for example, retrieve a received signal strength indication value corresponding to the measured received signal strength of the received reply message.

Figure 3:
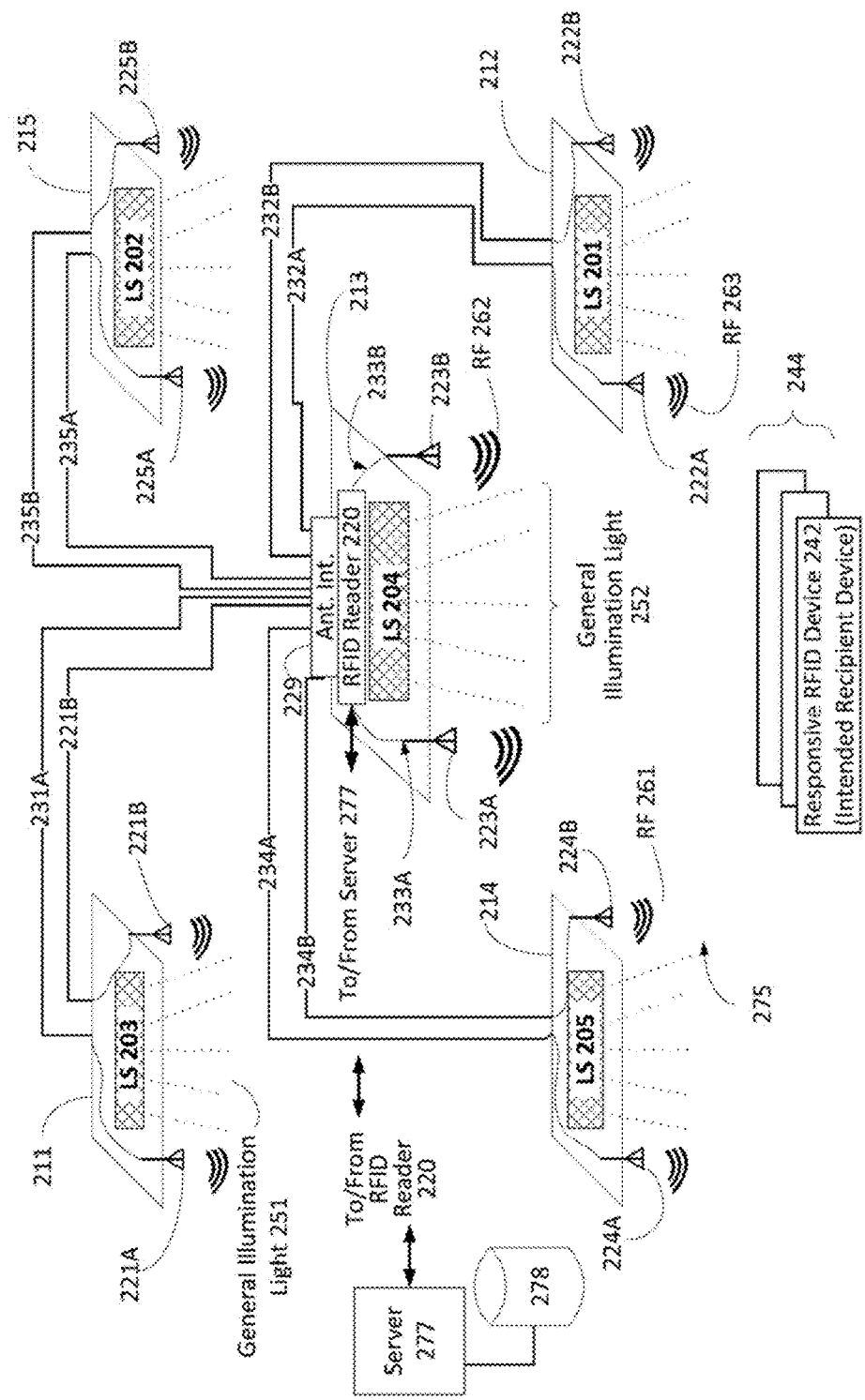
FIG. 3 illustrates an example of a lighting system including a number of luminaires, an RFID reader internal to one of the number of luminaires, and a responsive device.

It may be helpful to describe a system example that includes a luminaire, such as the luminaire example of FIG. 1 and an RFID reader, such as the RFID reader example of FIG. 2. FIG. 3 illustrates an example of a lighting system 200 including a number of luminaires 211-215, an RFID reader 220 internal to one of the number of luminaires 211-215, and a number of responsive RFID devices 242 and 244. A gateway controller or server 277 is communicatively coupled to the RFID reader 220. The server 277 may, for example, provide messages for communication by the RFID reader as RFID signals that are received and responded to by one or more of the responsive devices 242 in the number of RFID devices 244 in the space 275. For example, the RFID signals may be specifically addressed signals intended for reception by an intended recipient device among the number of RFID devices 244 in the space 275. In a specific example, the intended recipient device may be responsive RFID device 242 and the specifically addressed signal may be referred to as an intended recipient device message.

In addition, the server 277 may, for example, include a processor and programming that configures the server 277 to functions such as perform distance estimates/determinations between a responsive RFID device and a respective antenna based on signal attributes measured, determined by signals received by the respective antennas 221A-4225B, or the like. The server 277 may also be coupled to a data storage, such as 278.

In the FIG. 3 example, the system 200 includes a number of luminaires located within a space 275. Each luminaire of the number of luminaires 211-215 includes a light source, such as LS 202-LS204, and an antenna, such as 221A-225B.

Each of the light sources LS 202-LS 204 is configured to provide general illumination light, to the space 275. For example, light source LS 203 of luminaire 211 is configured to output general illumination light 251, while light source LS 204 of luminaire 213 is configured to output general illumination light 252.

In the example, at least one of the luminaires 211-215 has an RFID reader 220 internal to the luminaire. Specifically, in the example of FIG. 3, the RFID reader 220 is shown internal to luminaire 213. The RFID reader 220 of FIG. 3 is internal to luminaire 213, but similar to the RFID reader of FIG. 2. For example, while not shown in the example of FIG. 3, the RFID reader 220 may include a reader processor, and a reader radio frequency transceiver. As in the example of FIG. 2, the RFID reader 220 of FIG. 3 is communicatively coupled to an antenna interface 229. The antenna interface 229 may be either internal or external to the RFID reader 220. The RFID reader 220, in this example is collocated with one luminaire, in this example, luminaire 213 of the number of luminaires 211-215. In this example, the antenna interface 229 may also be collocated with the luminaire 213.

The example luminaires in FIG. 3 are shown with two antennas, but each of the respective luminaires 211-215 may incorporate more or less antennas depending upon a variety of reasons, such as RF propagation factors, space propagation factors, standard compliance reasons or the like. Each antenna 221A-225B may be configured for wireless radio frequency communication within the space at a particular radio frequency range. The RFID reader 220 may assign a unique identifier to each antenna 221A-225B. Each antenna 221A-225B may be communicatively coupled to the antenna interface 229. For example, luminaire 211 has antennas 221A and 221B. The antennas 221A and 221B are coupled to the antenna interface 229 via communication media 231A and 231B. Similarly, the antennas 222A and 222B of luminaire 212 are coupled to the antenna interface 229 via communication media 232A and 232B, the antennas 223A and 223B of luminaire 213 are coupled to the antenna interface 229 via communication media 232A and 232B, the antennas 224A and 224B of luminaire 214 are coupled to the antenna interface 229 via communication media 234A and 234B, and the antennas 225A and 225B of luminaire 215 are coupled to the antenna interface 229 via wired connections 235A and 235B. The respective wired connections 231A-235B between the antenna interface and the respective antennas 221A-235B may be coaxial cables, Ethernet cables, twisted copper pairs, fiber optic cable, or the like. Due to a desire for accuracy, the specifications and electrical properties of the wired connections as well as any ancillary items such as opto-electrical converters, amplifiers, connectors, splices or the like may be determined. For example, the specifications may include the length of wired connection, and the electrical properties may include impedance value per foot or meter, material content, or the like. To maintain consistency of any measurements of the signal attributes that are made at the RFID reader 220, the communication path between the respective antennas 421A-425B and the RFID reader 220 is easily maintained and modeled to account for any signal loss or the like. In other words, there are no sources of interference or arbitrary signal loss bin the communication path between the respective antennas 421A-425B and the RFID reader 220 formed by the wired connections 431A-435B.

In general, the RF response device 242 and other responsive RF devices 244 may be "passive" devices each be configured to use the energy from received signals for power to generate and send a response to inquiries received via RF signals from the respective antennas 221A-225B. Alternately, the responsive RF devices 242 and 244 may be "active" devices that have a power supply such as a battery, solar cell or the like. Regardless of whether the responsive RF device is a passive or active device, the responsive RF devices 242, 244 are each configured with an address or identifier that uniquely identifies the responsive RF device 242 from the other RF response devices 244. The unique identifier or address allows communications from the RFID reader 220 to be specifically addressed to a respective one of the responsive devices 242, 244, in which case the specifically addressed responsive device is an intended recipient of the communication signals transmitted by the RFID reader 220 are described in more detail with reference to later figures.

Figure 4:
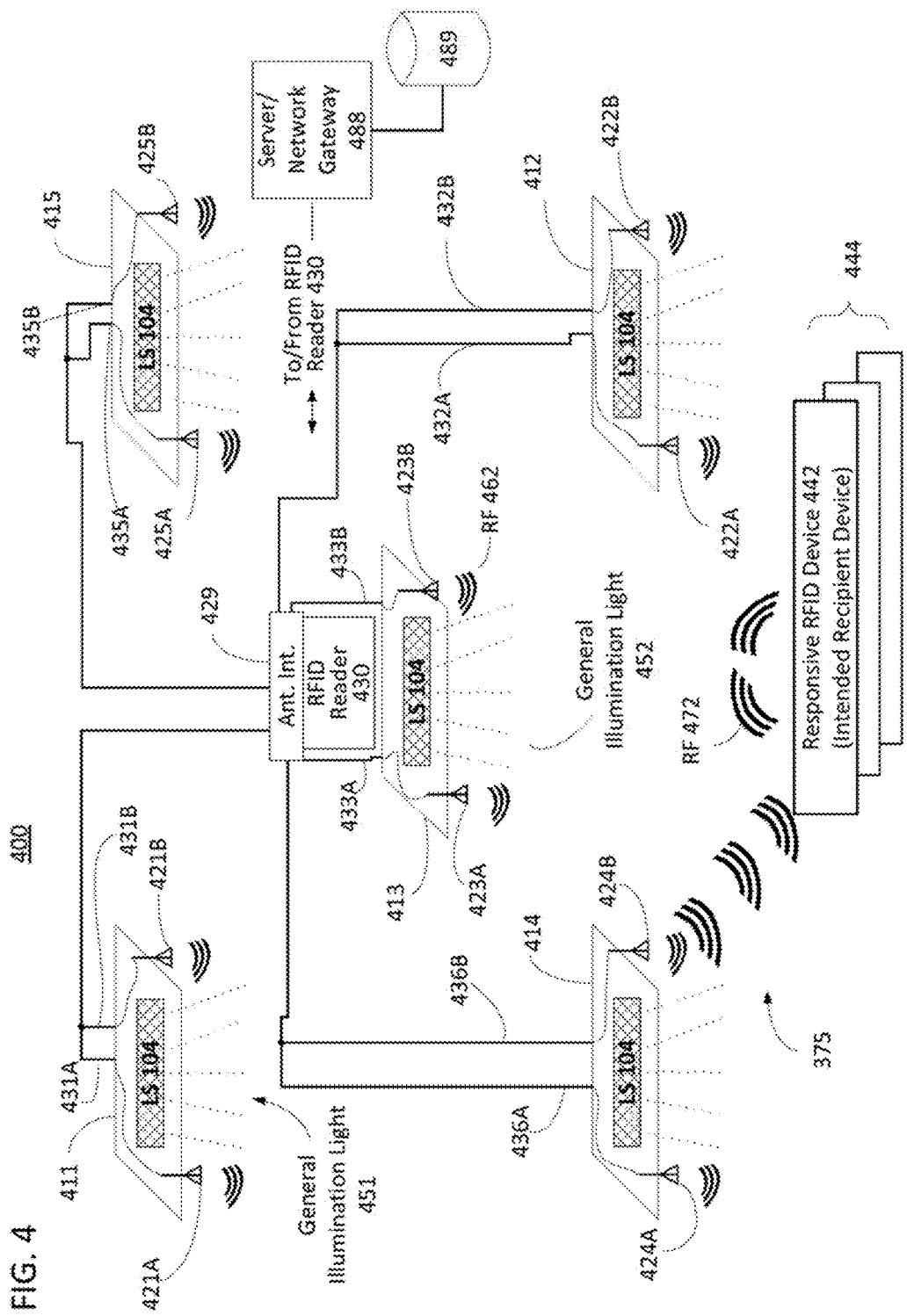
FIG. 4 illustrates another example of a lighting system that includes a number of luminaires, a remote RFID reader, and a responsive device.

Other system configurations are also envisioned. In another example, the system illustrated in FIG. 4 is an example of a lighting system that includes a number of luminaires, at least one responsive device, but with an RFID reader that is remote from a luminaire. In the example of FIG. 4, each of the luminaires 411-415 may be configured substantially exactly alike. For example, using luminaires 411 as a model, the luminaire 411 may include antennas 421A and 421B, and a light source LS 104. The other luminaires 412-415 in this example are configured in a similar manner as luminaire 411. For example, the light sources LS104 of each of the number of luminaires 411-415 may be configured to provide general illumination light to the space 375. The light sources LS 104 provide general illumination light to the space 375.

In addition, instead of the RFID reader being collocated with a luminaire, such as RFID reader 220 of FIG. 3, the RFID reader 430 in the example of FIG. 4 is located remotely from the plurality of luminaires 411-415. Each of the luminaires 411-415 may have a number of antennas integrated in, coupled to, or collocated with the respective luminaire. For example, luminaire 412 is shown with antennas 422A and 422B, and luminaire 415 is shown with antennas 425A and 425B. Each of the antennas 421A-425B of all the luminaires 411-415 may have an assigned identifier that uniquely identifies the respective antenna in the group of antennas 421A-425B. Each of the antennas 421A-425B may be configured for wireless radio frequency communication within the space 375.

The antennas 421A-425B of the respective luminaires 411-415 are communicatively coupled to the antenna interface 429 via wired connections 431A-435B. The antenna interface 429 is coupled to the RFID reader 430 that allows the RFID reader 430 to send messages for transmission by one or more of the antennas 421A-425B. For example, the antenna interface 429 may be a selectable antenna interface, such as antenna interface 290 of FIG. 3, and may be configured to couple to each respective antenna 421A-425B of the number of luminaires 411-415 within the space 375 in response to an inputted antenna selection signal. In some examples, when an antenna is selected for transmitting signals from and receiving signals for the RFID reader 430 via the antenna interface 429, the selected antenna is referred to as the "currently active" antenna. More details of an example of selectable antenna interface 429 is provided with respect to other examples.

The respective wired connections 431A-235B between the antenna interface 429 and the respective antennas 421A-425B may be coaxial cables, Ethernet cables, twisted copper pairs, fiber optic cable, or the like. Due to a desire for accuracy, the specifications and electrical properties of the wired connections as well as any ancillary items such as opto-electrical converters, amplifiers, connectors, splices or the like may be determined. For example, the specifications may include the length of wired connection, and the electrical properties may include impedance value per foot or meter, material content, or the like.

A gateway controller or server 488 is communicatively coupled to the RFID reader 430. The server 488 may, for example, provide messages for communication by the RFID reader 430 as RFID signals that are received and responded to by one or more of the responsive devices 442 of the number of responsive RF devices 444. The server 488 may, for example, include a processor and programming that configures the server 488 to perform functions, such as distance estimates/determinations between a responsive RF device and a respective antenna based on signal attributes measured or determined by signals received by the respective antennas 421A-425B. The server 488 may also be coupled to a data storage, such as 489.

While the lighting systems 200 and 400 are shown having five luminaires, the lighting systems may have additional luminaires. For example, the lighting system may have six, eight or more luminaires. Of course, fewer luminaires may be included in the lighting system. It is also envisioned that a number of lighting systems may be cascaded together to form an asset tracking system.

Figure 5:
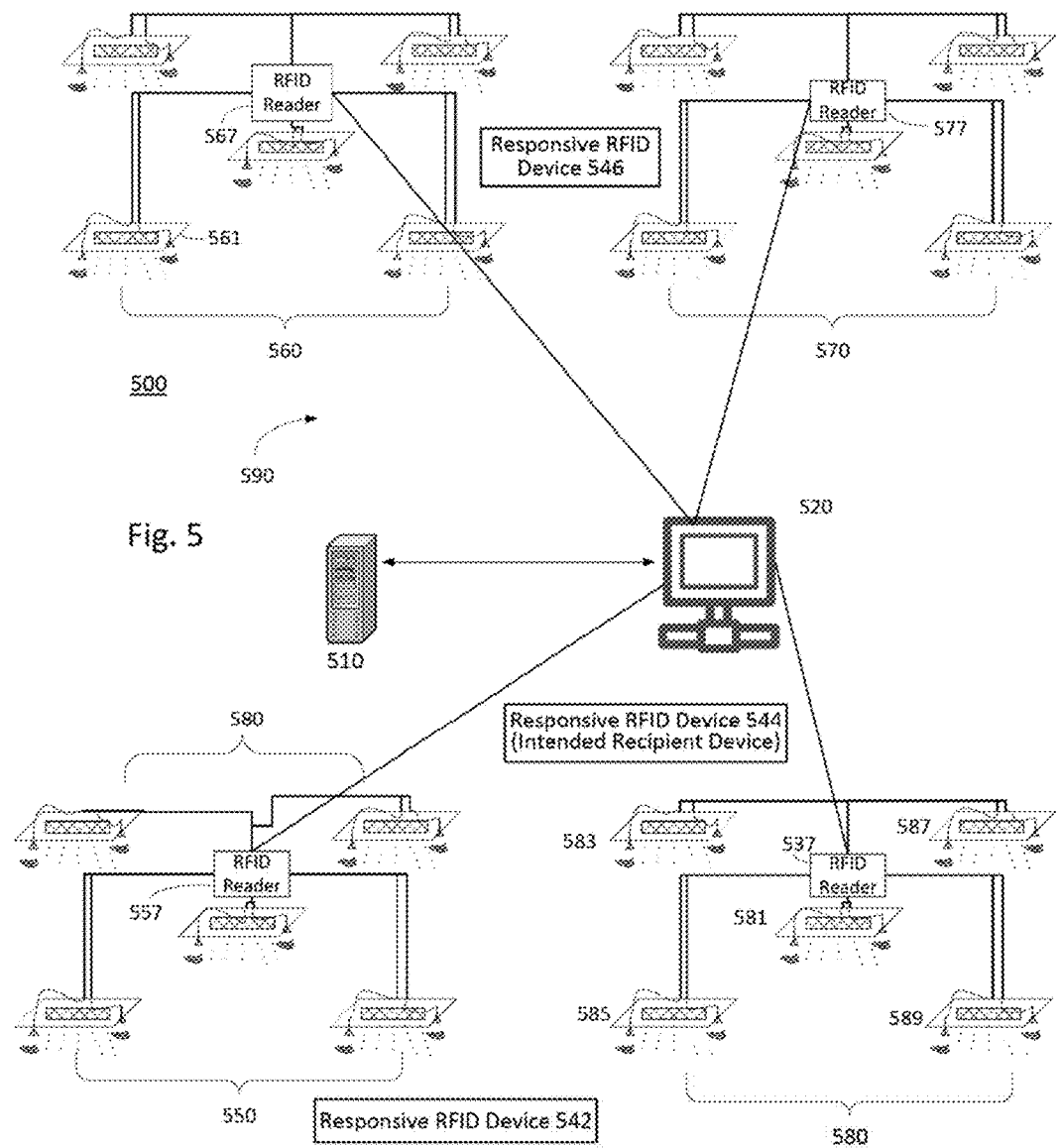
FIG. 5 illustrates an asset tracking system incorporating a number of lighting systems.

An example of such an asset tracking system is described with reference to FIG. 5. FIG. 5 illustrates an asset tracking system incorporating a number of lighting systems.

In the example of FIG. 5, the system 500 may include number of luminaires are a subset of a larger group of luminaires. Lighting systems 550, 560, 570 and 580 may be lighting systems such as those described with reference to FIGS. 3 and 4, and may be located within space 590. Each of the lighting systems 550, 560, 570 and 580 may include a number of luminaires coupled to a respective RFID reader. For example, the lighting system 580 includes luminaires 583, 585, 587 and 589 that are coupled to RFID reader 537. The luminaires 581-589 of lighting system 580 is a subset of the larger group of luminaires in the lighting systems 550, 560 and 570. The luminaires of each respective lighting system 550, 560, 570 and 580 are coupled to a different RFID reader. For example, luminaire 582 of lighting system 580 is coupled to RFID reader 537, while luminaire 561 is coupled to RFID reader 567. Each of RFID reader 557, 567, 577, and 537 in each respective lighting system 550, 560, 570, and 580 may be coupled to a server, or computing device 520. The RFID readers 557, 567, 577, and 537 may be networked together in different configurations, such, for example, as the centralized network configuration shown in FIG. 5, a mesh configuration or other network configuration. The server 520 may receive information regarding signals received from each respective responsive RF device 542 and 534. For example, the server 520 may be configured, for example, to retrieve determined attributes for reply messages received from respective responsive RF devices 542 or 534, and estimate or determine a location within the space from which the received reply message was transmitted.

The computing device 520 may similarly be connected to a computer device 510. The computing device 510 may be a cloud computing device, a server or the like. The computing device 510 may be configured to assist the server 520 in performance of the location estimation service or provide data storage or other services to the server 520.

Figure 6:
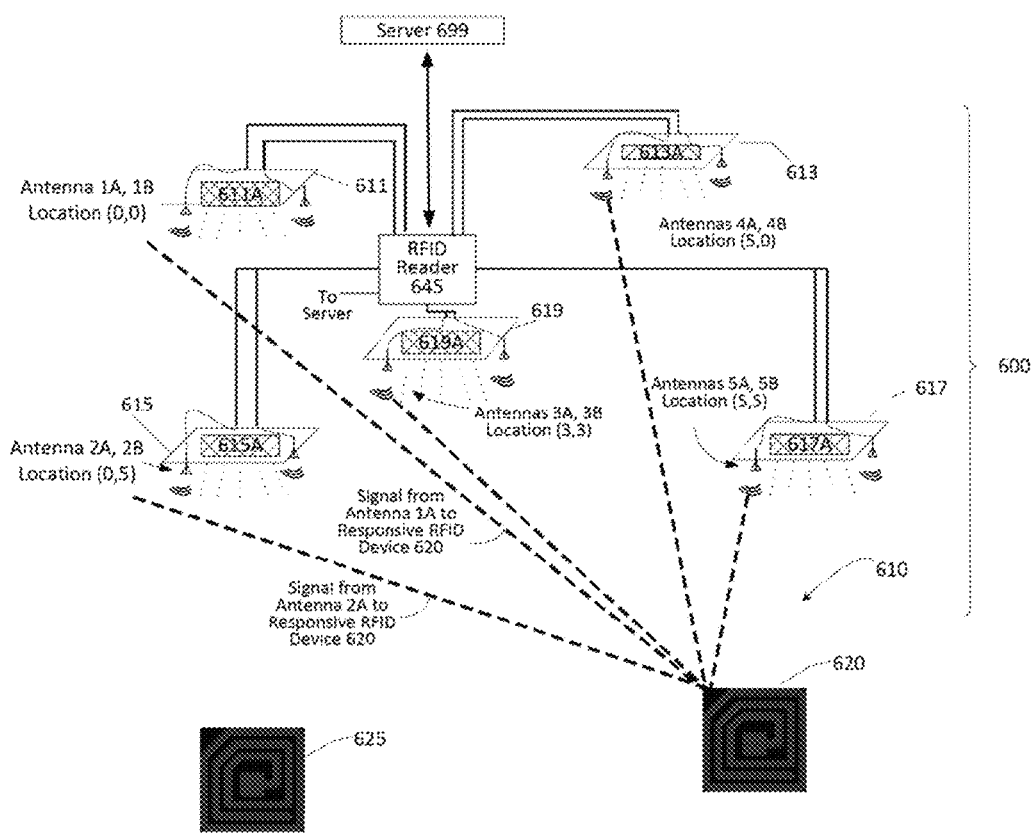
FIG. 6 illustrates another example of a lighting system configuration illustrating example communications with a responsive device.

FIG. 6 illustrates another example of a lighting system configuration illustrating example communications with a responsive RF device. The lighting system 600 may be located in space 610. Also, located in space 610 may be one or more responsive RF devices, such as 620 and 625, that are configured to communicate with the luminaires 611, 613, 615 and 617 of the lighting system 600. The respective luminaires 611, 613, 615, and 617 of lighting system 600 may each include one or more antennas (1A, 1B, 2A, 2B, 3A, 3B, 4A, 4B, 5A, 5B, respectively), a light source (611A, 613A, 615A, 617A, 619A). The one or more antennas are coupled to an RFID reader 645. When the lighting system 600 is installed, each of the respective luminaires 611, 613, 615 and 617 may be positioned at a known location, such that an antenna on each of the respective luminaires is also at the known location. Alternatively, the known locations of the respective antennas may be determined after installation by utilizing a number of location determination techniques that may be used in a commissioning process that commissions the respective antennas into a network of devices. In the example of FIG. 6, the locations of the antennas 1-5 of the respective luminaires 611, 613, 615, 617 or 619 of lighting system 600 within space 610 are known. For example, antennas 1A, 1B may be approximately at location (0,0), antennas 2A, 2B may be approximately at location (0,5), antennas 3A, 3B may be approximately at location (3,3), antennas 4A,4B may be approximately at location (5,0), and antennas 5A, 5B may be approximately at location (5,5). The approximate location of the responsive RF device 620 may be determined using the known approximate locations of the respective antennas 1A-5B.

The RFID reader 645 may be configured in substantially the same manner as RFID reader 280 of FIG. 2. For example, the RFID reader 645 may be communicatively coupled to a server 699. The server 699 may be configured with a processor and/or memory (not shown in this example). The server 699 may provide control signals, such as antenna identifiers, or the like, and also provide services such as location estimation/determination services. For example, the server 699 may process signal attribute measurements or signal attribute-related data for, in combination with, the RFID reader 645. The RFID reader 645 may transmit a signal that is an intended recipient message specifically addressed to responsive RF device 620. For example, as shown by the dashed lines traversing from respective antennas 1A, 2A, 3A, 4A, and 5A, toward the responsive RF device 620, intended recipient messages transmitted as radio frequency signals may be transmitted individually (e.g., intended recipient message transmitted iteratively from antenna 1A, then antenna 2A, then antenna 3A, and so on), simultaneously (e.g. all antennas 1A-5A transmit an intended recipient message) and/or as groups (e.g., intended recipient message transmitted simultaneously only by, for example, antennas 1A and 3A, then followed by intended recipient message transmitted by antennas 2A and 4A). The transmitted intended recipient message contains the unique identifier of the selected antenna and an address of the intended recipient device (i.e., 620) within the space 610. In response to receiving the intended recipient message from an antenna, the responsive RF device 620 may determine it is an intended recipient device based on a comparison of the address in the intended recipient message to the responsive RF device's address (or identifier). In response to the determination by the responsive RF device 620 that it is the intended recipient device, responsive RF device 620 may respond with a radio frequency reply message that is received at the antenna (e.g., antenna 1A) that transmitted the intended recipient message received by the responsive RFI device 620. Alternatively, in response to the transmitting of the intended recipient message, the reply message from the intended recipient device 620 may be received at least one of the respective one or more antennas 1A-5B, which may or may not include the antenna that transmitted the intended recipient message (e.g. antenna 1A). In circuitry (not shown) either coupled to the receiving antenna in the luminaire (e.g., 611 if the receiving antenna is antenna 1A) or at the RFID reader 645, an attribute of the received reply message is measured or calculated that may be used to determine the location of the responsive RF device 620. For each iteration, a record may be maintained in a data storage device (not shown in this example) associated with the RFID reader 645 or server 699. The record may include the obtained signal attribute in association with the unique identifier of the selected antenna and the intended recipient address.

Responsive RF device 625 may also be receive the intended recipient message transmitted from the RFID reader 645. However, the responsive RF device 645 may determine that it is not the intended recipient device of the intended recipient message, and may, for example, return to a prior state before receiving the intended recipient message.

Figure 7:
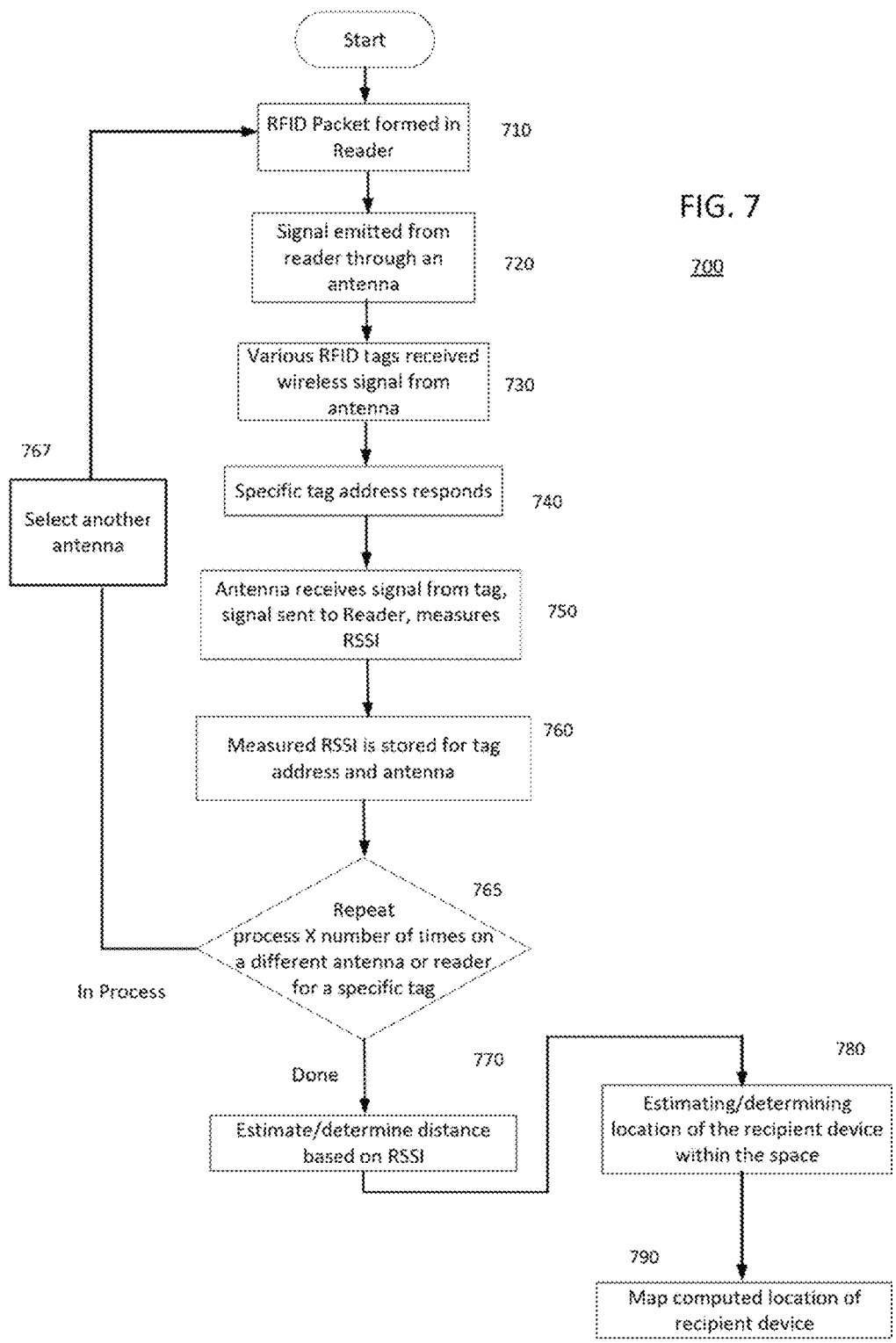
FIG. 7 is a flowchart illustrating a process example that utilizes a lighting system such as any of those shown in FIGS. 1-6.
Figure 8:
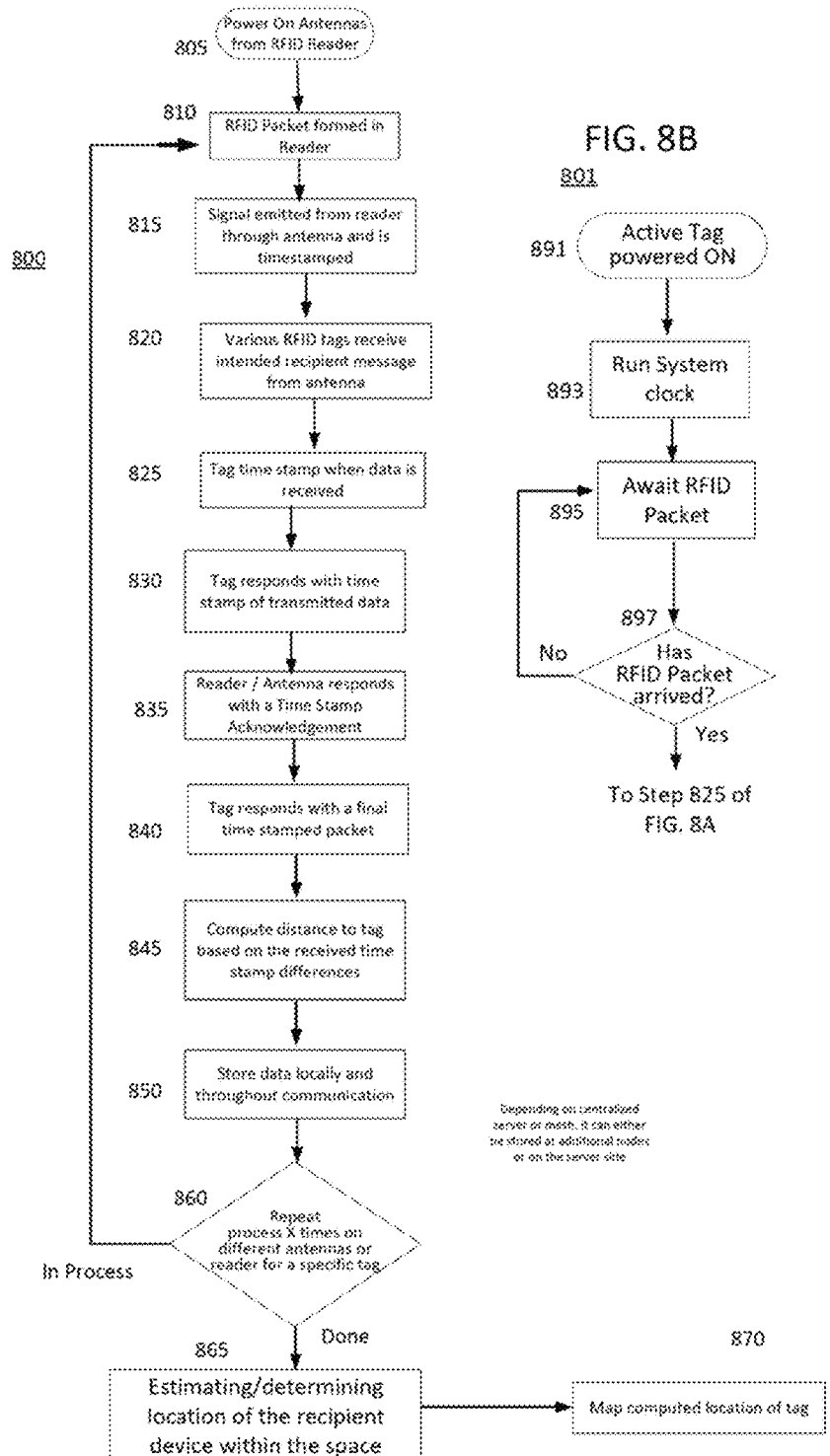
FIG. 8A is a flowchart illustrating a system process example, based on a different signal attribute than that described relative to FIG. 7.
FIG. 8B is a flowchart illustrating a process performed by a responsive device when participating in the system process described with respect to FIG. 8A.
Figure 9:
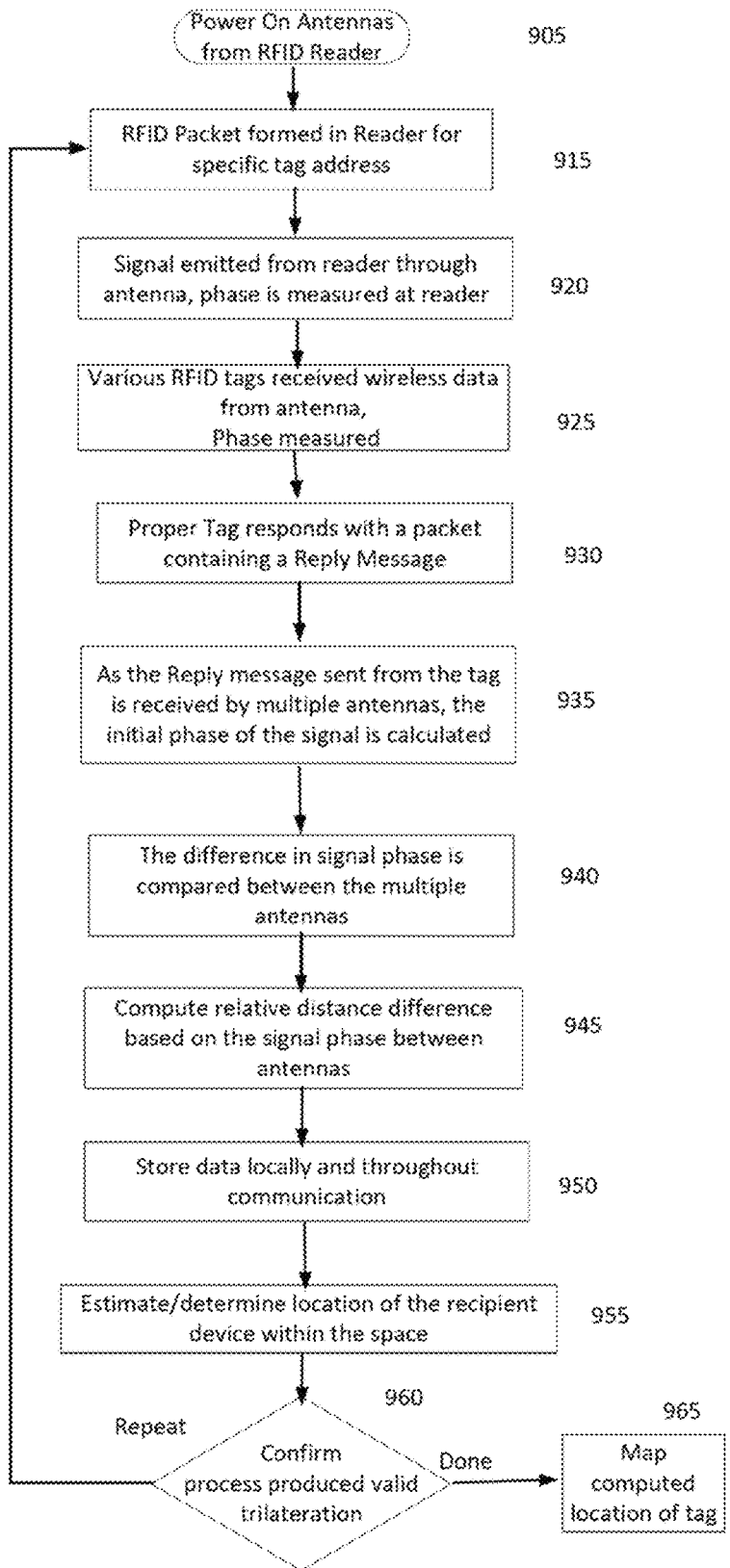
FIG. 9 is a flowchart of another example of a process that may be performed by an RFID enabled lighting system.

It may be appropriate to describe with greater specificity examples of the signal exchange between an RFID reader, such as 645 and a responsive RFID device, such as 620, with reference to the flowcharts of the examples shown in FIGS. 7-9. As described in the examples, the exchanged signals are used to determine the location of the responsive RFID device.

FIG. 7 is a flowchart illustrating a process example that utilizes a lighting system such as that shown in FIGS. 1-6, The process 700 is described with reference to the system components illustrated in the example of FIG. 6. The responsive RFID devices, or tags, described in the example of FIG. 7 may be either active or passive tags.

The process 700 is also an iterative process. Since there are a number of antennas, such as antennas 1A-5B, and each antenna of antennas 1A-5B may or may not be selected as a selected antenna to transmit an intended recipient message to the same intended recipient, the following steps 710-760 may be repeated for each antenna that is selected for transmission of an intended recipient message to the same intended recipient.

At the start of the process 700, an RFID reader, whether collocated with a luminaire (as in the example of FIG. 3) or located remotely (as in the examples of FIGS. 4 and 6), is coupled to one or more of a number of antennas for communication purposes, such as transmission of an intended recipient signal and reception of a reply message. In addition, the RFID reader, such as 645, generates an RFID packet for transmission (710). The RFID packet may, for example, include an address of an intended recipient device within the space and a unique identifier of the respective one (or more) antenna(s) selected (i.e., selected antenna(s)) to transmit the intended recipient address. For example, the unique identifier may be a representation of a serial number, such as 123ABC456X, and the intended recipient device address may be a representation of an address, such as MNI:MNI:MNI:SS:SS:SS, "responsive RFID device 620," or the like. The form of the packet may follow specific guidelines, such as EPC™ Radio-Frequency Identity Protocols Generation-2 UHF RFID or the like. An RFID transceiver, not shown in the example of FIG. 6, but such as 285 of FIG. 2, may be coupled to the RFID antennas 1A-5B in the luminaires, such as 611, 613, 615, 617 and/or 619 of FIG. 6 in a lighting system, such as 600. The RFID transceiver emits a signal with the contents of the generated packet. The generated packet contents encompassing the RFID intended recipient message. The emitted RFID intended recipient message is transmitted from at least one antenna in a respective one of the number of luminaires in the lighting system (720). At 730, one or more various responsive RFID devices in the space 610 receive the RFID intended recipient message wirelessly transmitted from the at least one antenna. The specific responsive RFID device (also referred to as a "tag") that has the address of the intended recipient device is one of the one or more various responsive RFID device that receives the intended recipient message. Each responsive RFID device is configured with logic circuitry and memory (described in more detail with respect to the example of FIG. 13). The memory may, for example, store an address of the responsive RFID device. After wirelessly receiving the emitted RFID intended recipient message, for example, each tag is configured to determine whether it is the intended recipient device by comparing the address in the intended recipient message to an address stored in memory of the tag. For example, the specific responsive RFID device that is the intended recipient device determines that the address of specific responsive RFID device is the address stored in its memory. Continuing with the example, in response to the determination that the selected antenna is addressed to the intended recipient device, a reply message is generated by the responsive RFID device at 740. The generated reply message may, for example, include the unique identifier of the selected antenna and the intended recipient device address. The generated reply message from 740 may conform to the EPC™ Radio-Frequency Identity Protocols Generation-2 UHF RFID or another communication protocol.

In a more specific example, the responsive RFID device or tag receives the RF signal containing the intended recipient message, decodes the signal to obtain the RFID intended recipient message, and parses the RFID intended recipient message to obtain the address of he intended recipient and the unique identifier that identifies the transmitting antenna. The responsive RFID device confirms that the unique identifier in the RFID intended recipient message matches the specific responsive RFID device's unique identifier. Upon successful confirmation, the intended recipient responsive RFID device (i.e. "recipient device"), at 740, responds with a reply message signal.

At 750, the emitting antenna receives the responsive RFID reply message signal from the intended recipient device within the space. The reply message signal received at the antenna is forwarded to the RFID reader's processor. At 760, the RFID processor determines a signal attribute of the reply message signal (also referred to as "the determined reply message attribute") received via the selected antenna. Examples of the attribute of the received reply message is at least one of received signal strength, phase, time difference of arrival, or the like. The determined attribute of the received reply message is usable in estimating a location within the space from which the received reply message was transmitted. In another example not illustrated in FIG. 7, the RFID processor if coupled to another of the antennas coupled to the same or another luminaire may also receive the transmitted reply message received by those respective antennas. The signal received by the other antenna may be processed to determine a signal attribute of that reply message. In the example of FIG. 7, the determined reply message attribute, or signal attribute, is the received signal strength indication (RSSI). The use of other types of signal attributes may be used to determine distances. Signal attribute examples, such as time of transmission and receipt, phase shift and the like, are described with respect to the examples of FIGS. 8A, 8B and 9.

Returning to the example of FIG. 7, at 760, the measured received signal strength of the reply message may have a corresponding RSSI value, or be represented by an RSSI value. The received signal strength indication value may be stored in a memory at the RFID reader, such as 645, or may be forwarded to a server, such as 488, for storage. Alternatively, or in addition, depending on centralized server or a number of respective RFID readers within a space, the respective RSSI values may be either stored at additional RFID readers or on at the network gateway/server side (e.g., at 277 in 278 of FIG. 3 or at 488 in 489 of FIG. 4, or 520 of FIG. 5).

As mentioned above, the process 700 is an iterative process. In an example of the iterative process, a number of antennas are iteratively selected by the RFID reader to transmit an intended recipient message to the address of the intended recipient device for a predetermined number of iterations, e.g., X. During each iteration, the intended recipient message may include the address of the same responsive RFID device, but the antenna identifier may change in each iteration based on the antenna selected by the RFID reader to transmit the intended recipient message.

Of course, various combinations of iterations based on using the same antenna, different antennas, same luminaire, different luminaires, same RFID readers and different RFID readers have also been contemplated. For example, the same antenna may transmit a number of intended recipient messages each separately addressed to a different address for an intended recipient device (i.e., a specific responsive RFID device). In another example, a different iterative process may be implemented in a system such as that shown in FIG. 5. In this different iterative process, a different RFID reader may be used in a subsequent iteration. More specifically, in an iteration the selected antenna is one of the antennas of the luminaire 561 of the lighting system 560 and the RFID reader 567 transmits the intended recipient message and processes the reply message received from the intended recipient device, which may be in this iteration, responsive RFID device 546. In a subsequent iteration, the selected antenna may be an antenna of luminaire 581 of lighting system 580, the responsive RFID device 546 may be the intended recipient device, but the RFID reader 537 transmits the intended recipient message and processes the reply message received from the intended recipient device. Other combinations of antennas, luminaires, RFID readers and/or responsive RFID devices may be used in one or more iterations of the processes examples described with reference to FIGS. 7-9, the described process examples are provided for purposes of illustration and general understanding, and are not intended to be limiting.

Returning to the example of FIG. 7, at step 765, it may be determined that another iteration is required (i.e. "in process"). If it is determined another iteration is required, the process proceeds from 765 to 767. At 767, another antenna is selected from the antennas in the group of luminaires, such as an antenna coupled to the same reader or coupled to a different but nearby reader. For example, antenna 1A of FIG. 6 may have been the currently active antenna in a just-completed iteration, while in the subsequent iteration the RFID reader 645 may have been configured to or instructed to select antenna 2A of FIG. 6. After an antenna is selected at 767 to replace the currently active antenna in the next iteration of the iterative process, the process 700 returns to step 710. Upon the return to step 710, the process steps 710-760 are repeated as substantially described above except that the intended recipient message transmitted in this next iteration includes the unique identifier assigned to the selected, currently active antenna, e.g., antenna 2A. In other words, the intended recipient message transmitted in this next iteration includes a different antenna's unique identifier, but the same intended recipient address.

The number of iterations X needed to satisfy the decision at 765 may be 3, 6, 12, all of the antennas in a participating lighting system, or another number that enables location estimation/determination accuracy acceptable for a particular application. For example, if the responsive RFID device being addressed is attached to/associated with a large object, e.g., a forklift, a shipping container, a copier, treadmill or the like, the granularity of the location estimation/determination may be coarser. Based on the assumption that the greater the number of iterations, the greater the accuracy of the location estimation/determination, then the number of iterations may be less for the coarse location estimation/determination. Conversely, if the responsive RFID device being addressed is attached to/associated with a smaller object, such as a wheelchair, a printer, a basket, a retail store product, a slipper or the like, the granularity of the location estimation/determination may need to be finer, then a greater number of iteration may be desired to provide the finer accuracy. In an example, the number of iterations may be based on the address or a descriptor (e.g., printer, cargo container) of the intended recipient device, and as such, the number of iterations may vary. Alternatively, the number of iterations may remain fixed, e.g., 3, because this number of iterations is known to provide sufficient accuracy for a number of applications.

When the decision at 765 is "done," thereby indicating the completion of the number of predetermined iterations of the process steps 710-760, the process 700 proceeds from step 765 to 770.

At 770, the measured RSSI values are used to estimate/determine distance between the antenna and the location from where the reply message was transmitted. Prior to making the estimate/determination, records of the number of determined reply message attributes corresponding to the intended recipient address may be retrieved from the memory, either the memory of an RFID reader or from a storage associated with a network gateway/server coupled to the RFID reader. In more detail, the determined signal attributes of the reply message signals received via the plurality of antennas (e.g., the RSSI values) and information about locations of the plurality of antennas (e.g., coordinate locations (such as 5,0 or 0,0), actual latitude and longitude, or the like) may be processed by the respective RFID reader or by a network gateway/server. The processing of the RSSI values and the information about locations of the plurality of antennas determines respective distances from each respective antenna to the location of the space from which the received reply message (that provided the measured RSSI value) was transmitted. After determination of the respective distances at 770, the process 700 proceeds to 780. Using the respective distances, a location within the space of the recipient device from which transmitted the received reply message may be estimated/determined (780).

With regard to the location estimating/determining performed in step 780, different techniques maybe applied to the respective determined distances and known antenna locations to estimate/determine the location from which the received reply message was transmitted. For example, trilateration techniques may be applied to determine the location within the space from which the reply message was transmitted.

In a specific example, a first, second and third record may be retrieved from the data storage. The records may correspond to antennas 1A, 2A and 3A of FIG. 6. A processor in either an RFID reader 645 or a network gateway/server, such as 699, may determine, using the obtained attribute in each of the respective first, second and third records, a distance measure of the intended recipient device, such as 620 of FIG. 6, from the selected antenna (e.g., 1A, 2A or 3A) in each of the first, second and third records. The processor, using the distance measures determined from each of the first, second and third records and known locations of the selected antennas of each respective first, second and third records, may apply trilateration techniques to calculate a position of the intended recipient device with respect to the selected antennas of each respective first, second and third records.

After a location of the recipient device is estimated/determined in 780, the estimated/determined location of the recipient device is mapped to an indoor location map or the like that may be provided to a user device or the like (not shown) (790).

Trilateration techniques such as those used techniques to calculate a position of the intended recipient device may utilize distances determined from other types of signal attributes obtained from received reply messages. Examples of different types of signal attributes are described with respect to FIGS. 8A, 8B and 9.

FIG. 8A is a flowchart illustrating a process example that utilizes a lighting system such as that shown in FIGS. 1-6, and FIG. 8B illustrates a flowchart of an example process that may be performed by a responsive RFID device when participating in the process described with respect to FIG. 8A. The process 800 of FIG. 8A and process 801 of FIG. 8B will be described with reference to the lighting system 600 and responsive RFID device, or tag, 620 of FIG. 6. The responsive RFID devices, or tags, in the examples of FIGS. 8A and 8B are more than likely active tags. There may be passive tags that may be capable of "harvesting" and storing enough power to perform the functions described with reference to FIGS. 8A and 8B. Recall that an active tag may either include a power source, such as a battery, photovoltaic cell or the like, or a connection to an external power source, such as a battery source, a transformer of AC main power, or the like.

Similar to the process 700, the process 800 of FIG. 8A may be an iterative process. Since there are a number of antennas, such as antennas 1A-5B, in a lighting system, and each antenna of antennas 1A-5B may or may not be selected to transmit an intended recipient message to the same intended recipient, the following steps 810-860 may be repeated for each antenna that is selected for transmission of an intended recipient message to the same intended recipient.

In the process 800, an RFID reader, whether collocated with a luminaire (as in the example of FIG. 3) or located remotely (as in the examples of FIGS. 4 and 6), selects, at 805, one or more of a number of antennas for communication purposes, such as transmission of an intended recipient signal and reception of a reply message. In addition, the RFID reader, such as 645, generates an RFID packet for transmission (810). The RFID packet may, for example, include an address of an intended recipient device within the space and a unique identifier of the respective one (or more) antenna(s) selected to transmit the intended recipient address.

The RFID transceiver emits a signal with the contents of the generated packet. The generated packet contents encompassing the RFID intended recipient message. The emitted RFID intended recipient message is transmitted from at least one antenna in a respective one of the number of luminaires in the lighting system (815). At 820, one or more various responsive RFID devices in the space, such as 610, receive the RFID intended recipient message wirelessly transmitted from the at least one antenna. The specific responsive RFID device, or tag, that has the address of the intended recipient device is one of the one or more various responsive RFID device that receives the intended recipient message.

Each of the "active" responsive RFID devices, or "active" tags, in a space, such as 610, that participate in the process of the FIG. 8A example, may perform the process 801 of FIG. 8B. Each participating responsive RFID device may be powered ON using power from a battery or external power source (891). The ON responsive RFID device may be in a sleep state or low power mode, in which the responsive RFID device is waiting to receive a signal from another RFID device. In the sleep state or low power state, the responsive RFID device may continue to run a system clock (893) so that it has a time that is approximately synchronized (e.g. within a tolerance) with a clock of the RFID reader. The responsive RFID device waits for an RFID packet containing the intended recipient message at 895. When RFID signals are detected, the logic circuitry of the responsive RFID device (an example of which is explained in more detail with reference to FIG. 13) may process the received signal to determine if an RFID packet of the received signal contain the intended recipient device (897). Step 895 may be a sub-step related to step 820 of process 800 of FIG. 8A. When it is determined that an RFID signal containing the intended recipient message is received, the process 801 returns to step 825 of process 800 of FIG. 8A. At 825, the responsive RFID device using the responsive RFID device's clock may generate a timestamp indicating when the intended recipient message was received, and process 800 proceeds to step 830. The responsive RFID device may generate an interim reply message. The interim reply message may include the timestamp indicating when the intended recipient message was received, and the unique identifier of the antenna from which the intended recipient message was transmitted. The interim reply message may include additional information, such as the responsive RFID device address or the like.

The RFID reader receives the reply message transmitted by the responsive RFID device that was the intended recipient. In response to receiving the interim reply message, the RFID reader responds by transmitting a timestamp acknowledgement (835) and also generates a timestamp indicating when the timestamp acknowledgement was sent to the responsive RFID device by the RFID reader.

In response to receiving the timestamp acknowledgement, the responsive RFID device generates a timestamp of when the time stamp acknowledgement was received, and generates a final reply message that is transmitted to the RFID reader (840). The final reply message may include a final timestamp indicating when the acknowledgement was received from the RFID device. The final timestamp may also include a unique identifier of the antenna from which the intended recipient message was transmitted. The final reply message may include additional information, such as the responsive RFID device address or the like.

A number of additional process steps may be encompassed in step 845. For example, in 845, the RFID reader may be configured to determine a time difference between the RFID reader's timestamp indicating when the intended recipient message was transmitted and the interim reply message timestamp (of step 830). In addition, the RFID reader may be configured to determine a time difference between the RFID reader's timestamp of the timestamp acknowledgement message indicating when the timestamp acknowledgement message was transmitted and the time stamp final reply message timestamp (of step 840). The RFID reader may be further configured to average the two determined time differences or use only one if the determined differences are within a threshold. The RFID reader may be further configured to use the determined difference to compute a distance from the selected antenna that transmitted received the to the responsive RFID reader. When the distances are determined, the RFID reader may store the determined distances either in a memory coupled to the RFID reader (850).

The process 800 is an iterative process. In an example of the iterative process, a number of antennas are iteratively selected by the RFID reader to transmit an intended recipient message to the address of the intended recipient device for a predetermined number of iterations, e.g., X. During each iteration, the intended recipient message may include the address of the same responsive RFID device, but the antenna identifier may change in each iteration based on the antenna selected by the RFID reader to transmit the intended recipient message.

At step 860, it may be determined that another iteration is required (i.e. "in process"). If it is determined another iteration is required, another antenna is selected from the antennas in the group of luminaires. For example, antenna 1A of FIG. 6 may have been the currently active antenna in a just-completed iteration, while in the subsequent iteration the RFID reader 645 may have been configured to, or instructed to, select antenna 2A of FIG. 6. After an antenna is selected to replace the currently active antenna in the next iteration of the iterative process, the process 800 returns to step 810. Upon the return to step 810, the process steps 810-860 are repeated as substantially described above except that the intended recipient message transmitted in this next iteration includes the unique identifier assigned to the selected, currently active antenna, e.g., antenna 2A. In other words, the intended recipient message transmitted in this next iteration includes a different antenna's unique identifier, but the same intended recipient address.

The number of iterations X needed to satisfy the decision at 860 may be 3, 6, 12, all of the antennas in a participating lighting system, or another number that enables location estimation/determination accuracy acceptable for a particular application.

When the decision at 860 is "done," thereby indicating the completion of the number of predetermined iterations of the process steps 810-860, the process 800 proceeds from step 860 to step 865.

At 865, the determined differences are used to estimate/determine a location of the responsive RFID device that is the recipient device within the space, such as 610. With regard to the location estimating/determining performed in step 865, different techniques maybe applied to the respective determined distances and known antenna locations to estimate/determine the location from which the received reply message was transmitted. For example, trilateration techniques may be applied to determine the location within the space from which the reply message was transmitted.

After a location of the recipient device (i.e., responsive RFID device) is estimated/determined in 865, the estimated/determined location of the recipient device is mapped to an indoor location map or the like that may be provided to a user device or the like (not shown) (870).

FIG. 9 is a flowchart of another example of a process that may be performed by a lighting system, such as those in FIGS. 1-6. retrieve a signal phase representation corresponding to a signal phase of the received reply message when received by the respective selected antenna.

Unlike to the processes 700 and 800, the process 900 of FIG. 9 may not be an iterative process. In the process 900, all of or a number, such as 3, of the multiple antennas in the lighting systems described with respect to FIGS. 3-6 may be configured to and coupled to the RFID reader to simultaneously receive In the process 900, an RFID reader, whether collocated with a luminaire (as in the example of FIG. 3) or located remotely (as in the examples of FIGS. 4 and 6), selects, at 905, one or more of a number of antennas for communication purposes, such as transmission of an intended recipient signal and reception of a reply message. In addition, the RFID reader, such as 645, generates an RFID packet for transmission (915). The RFID packet may, for example, include an address of an intended recipient device within the space and a unique identifier of the respective one (or more) antenna(s) selected to transmit the intended recipient address.

At 920, the RFID transceiver emits a signal with the contents of the generated packet. The generated packet contents encompassing the RFID intended recipient message. When the emitted RFID intended recipient message is transmitted from the at least one antenna, the signal phase is noted by the RFID reader processor.

At 925, various responsive RFID devices, or tags, receive the transmitted signal containing the intended recipient message from the selected antenna, and the phase of the received signal is measured by the responsive RFID device. The various responsive RFID devices may be active RFID devices. Each of the various responsive RFID devices may measure the phase of the received signal, and process the received signal to determine whether the receiving device is the intended recipient of the message contained in the signal. If one of the various RFID devices is the intended recipient device, the responsive RF recipient device responds to the RFID reader (930). The responsive RF device that is the intended recipient may generate a data packet containing a reply message. The reply message that includes the unique identifier of the antenna that transmitted the intended recipient message. Alternatively, the reply message may simply be an acknowledgement message that is broadcast for all antennas of the RFID reader to receive.

At 935, the reply message sent from the intended recipient device is received by multiple antennas coupled to the RFID reader. The phase of the received signal is calculated at each of the multiple antennas that received the reply message. The phase of the transmitted signal measured by the RFID reader is compared to the calculated phase of the signal received at each of the multiple antennas that received the reply message (940). Based on the comparison, a phase difference at each antenna of the multiple antennas is determined. When determining the phase differences for each antenna, the antenna cabling distance is taken into accounted to ensure that the phase difference determination is accurate. At 945, a relative distance difference based on the signal phase between antennas may be calculated. For example, the shift of the signal may be compared to the speed of light, thereby comparing time differences, rather than comparing the actually received signal to the originally transmitted version. The calculated relative distance differences and/or other data may be stored in a memory of the RFID reader (950). Alternatively, or in addition, the calculated relative distance differences may either be stored at additional RFID readers (such as in the multiple lighting system example of FIG. 5 or in a data storage coupled to a server or network gateway.

At 955, the calculated relative distance differences are used to estimate/determine the location of the recipient device with the space. The distance determination uses known locations of the luminaires and/or the antennas. For example, the RFID reader, server or network gateway may be configured to use trilateration of the distances determined from the phase shift calculations to determine a location of the recipient device with respect to each of the antennas. At 960, the determined locations of the recipient device may be confirmed to be accurate using different techniques, such as comparing the determined location to a prior location of the recipient device, identifying values of the determined location is within the space, the determined location of the recipient device based on the phase difference calculations from each antenna is within a predetermined threshold, using known locations from BLE/Wi-Fi tracking on smart devices, location history of tags and/or smart devices, using a combination of techniques, such as RSSI and angle of arrival or TDOA, combine with non-RIFD location service, or the like. If determination is the locations are not accurate, the process requires a "Repeat." In the case that a repeat is necessary, the process 900 returns to 915, and steps 915-960 are repeated. Conversely, if the determination at 960 is the location are accurate, the process is "Done" and the process 900 continues to 965. At 965, after the estimated/determined location of the recipient device (i.e., responsive RFID device) is confirmed as accurate in 960, the estimated/determined location of the recipient device is mapped to an indoor location map or the like. The indoor map may be provided to, or accessed by, a user device or the like (not shown) that monitors the locations of responsive RFID devices.

FIGS. 10A to 10G illustrate examples of various diffusers with associated RFID antennas. In the examples of FIGS. 10A-10G, each antenna of each respective luminaire of the plurality of luminaires is collocated with a diffuser of each respective luminaire. The antennas of FIGS. 10A-10G are not drawn to scale with regard to the frequencies described herein. For example, in FIGS. 10A and 10B, the respective associated antennas 1010 and 1011 may be embedded in or attached to the respective diffusers 1000 and 1001. Similarly, the respective associated antenna 1012-1016 may be embedded in or attached to the respective diffusers 1002-1006. A respective antenna may be formed from copper, Indium-Tin-Oxide (ITO), a nano-mesh, such as silver or gold nano-mesh, carbon nanotubes, or the like. In addition, or alternatively, an antenna may be formed within layers of a printed circuit board. Each of the respective antennas 1010-1016 is configured to be used in a lighting system, such as those described with reference to the examples of FIGS. 1 and 3-6.

In FIGS. 10A and 10B, the respective diffusers 1000 and 1001 have curved surfaces. The antenna 1010 of FIG. 10A is arranged to traverse the curved surface of the diffuser 1000 in a repeated back-and-forth pattern along a longitudinal axis of the diffuser 1000. The antenna 1011 of FIG. 10B is arranged in the form of a square wave that extends along a longitudinal axis of the diffuser 1001. Of course, the square wave may be configured differently, such as having non-uniform peaks or the like. Alternatively, a different form of wave may be used, such as a sinusoid or a sawtooth waveform. In contrast to the curved diffuser surfaces of FIGS. 10A and 10B, the diffuser 1002 of FIG. 10C is circular. The diffuser 1002 shown in FIG. 10C may be incorporated into a drop-light-type of light fixture. The circular diffuser 1002 may have an antenna 1012 arranged in a pattern near a center of the diffuser 1002. While the diffuser 1002 is shown as a circle, the diffuser 1002 may be oval shaped. The antennas 1010, 1011 and 1012 may be monostatic antennas.

Figure 10I:
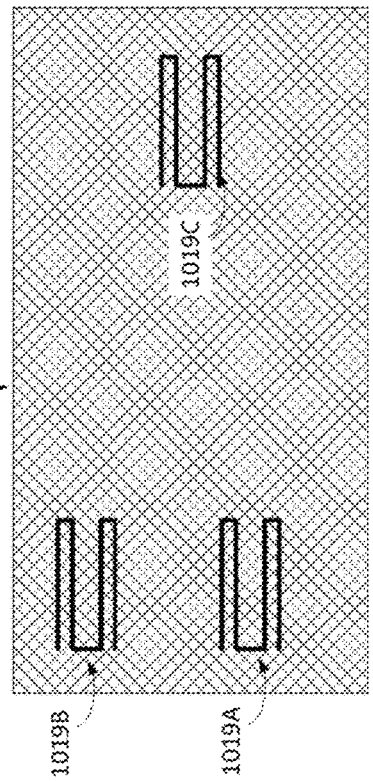
Figure 10H:
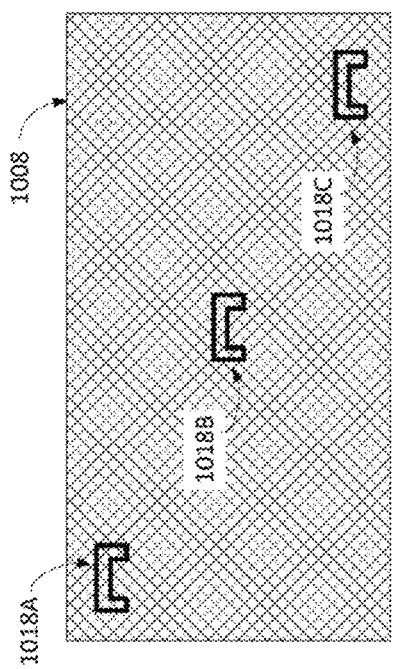

FIGS. 10D-10I illustrate examples of rectangular diffusers. In FIG. 10D, the antenna 1013 may be configured to follow the rectangular perimeter of the diffuser 1003. Alternatively, other antenna shapes may be used. Instead of the antenna following the perimeter of the diffuser as in FIG. 10D, an antenna may be arranged to follow a portion of the diffuser's perimeter. For example, the antenna 1014 follows the perimeter of the diffuser 1004 for approximately three-quarters of the perimeter, but extends toward the center of the diffuser 1004 at some point. The antennas 1013 and 1014 have been shown as having substantially closed shapes, however, in other examples, diffusers may form an open pattern. For example, the antenna 1005 may be arranged to extend about the area of the diffuser 1015. The diffusers 1001-1005 with antennas 1010-1015 may be paired with another diffuser having an antenna to provide the antenna pairs shown in the examples of FIGS. 1 and 3-6. In FIG. 10G, separate antennas 1016A-1016D may be located at different areas of the diffuser 1006, such as in the corners of the diffuser 1006. The separate antennas 1016A-1016B may connect separately to an RFID reader or may be connected to the RFID reader in pairs, such as antenna 1016B paired with antenna 1016C, or in another arrangement. While the antennas 1010-1016B are shown as heavy dark lines in the figures as compared to the respective diffusers, it is envisioned that the antennas 1010-1016D may be transparent, or substantially transparent, in an actual implementation. For example, the antennas 1010-1016D may be formed from materials such as indium-tin-oxide, an extra-fine strand copper, or the like. FIG. 10H illustrates another example of a diffuser configuration that has multiple antennas 1018A-1018C integrated therein. The antennas 1018A-C may be configured in a polygonal shape suitable for transmission of RF signals within a space. The antennas 1018A-C may be arranged at different locations along a diagonal axis of the diffuser 1008. The antennas 1018A-C may be coupled together to emit RF signals simultaneously, or may be individually coupled to an RFID transmitter for separate RF signal emissions. FIG. 10I illustrates yet another example configuration of a diffuser 1009 with integrated antennas 1019A-C. The antennas 1019A-C may be arranged at different locations within the diffuser 1009. The antennas 1019A-C may be coupled together to emit RF signals simultaneously, or may be individually coupled to an RFID transmitter for separate RF signal emissions.

FIGS. 11A to 11G illustrate examples of various luminaire housings with associated RFID antennas. Each of the respective antennas 1131-1034D is configured to be used in the lighting systems described with reference to the examples of FIGS. 1 and 3-6.

Figure 11B:
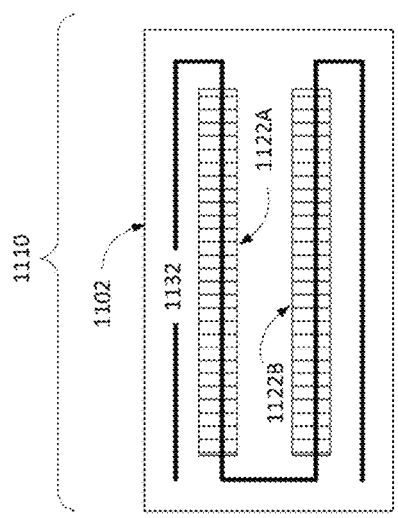
FIGS. 11A to 11F illustrate examples of various luminaire housings with associated RFID antennas.
Figure 11D:
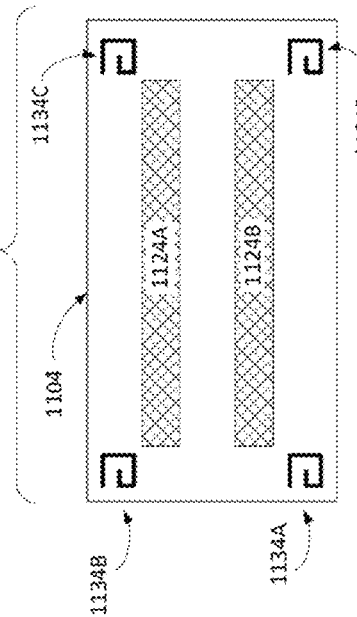
Figure 11A:
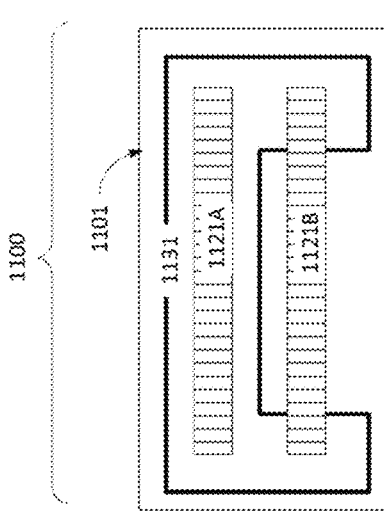

FIG. 11A illustrates an example of luminaire 1100 that includes a housing 1101, an antenna 1131 and light sources 1121A and 1121B. The antenna 1131 is coupled to the housing 1101, and is configured to be behind or in front of the light sources 1121A and 1121B. The light sources 1121A and 1121B are configured to provide general illumination light to the space in which the luminaires are located.

FIG. 11B illustrates an example of luminaire 1110 that includes a housing 1102, an antenna 1132 and light sources 1122A and 1122B. The antenna 1132 is coupled to the housing 1102, and is configured to be either behind or in front of the light sources 1122A and 1122B.

Figure 11C:
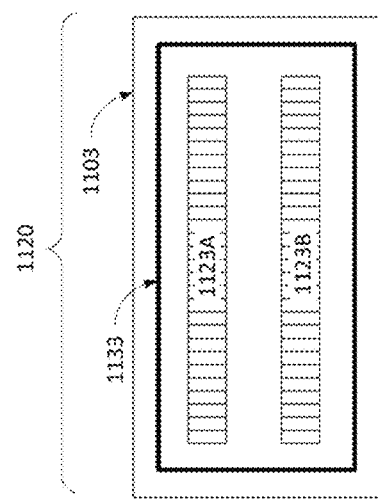

FIG. 11C illustrates an example of luminaire 1120 that includes a housing 1103, an antenna 1133 and light sources 1123A and 1123B. The antenna 1133 is coupled to the housing 1103 near the perimeter of the housing 1103. The antennas 1130 may surround the light sources 1123A and 1123B so as to not occlude the general illumination light emitted by the light sources 1123A or 1123B.

FIG. 11D illustrates an example of luminaire 1130 that includes a housing 1104, a first antenna 1134A, a second antenna 1134B, a third antenna 1134C, a fourth antenna 1134D, and light sources 1124A and 1124B. The housing 1104 is rectangular shaped, but may be other shapes, such as circular, hexagonal or the like. The four antennas 1134A-1134D may be positioned in the corners of the rectangular housing 1104. By positioning the four antennas 1134A-1134D in the corners, the antennas 1134A-1134D do not occlude the general illumination light emitted by the light sources 1124A or 1124B. Similar to the antennas 1016A-1016D of FIG. 10G, each of the antennas 1134A-1134D may be separately coupled to an RFID reader, such as the RFID readers of FIGS. 1 and 3-6. For example, the separate antennas 1134A-1134D may be connected to the RFID reader in pairs, such as antenna 1134B may be paired with antenna 1134C, or in another arrangement.

Figure 11E:
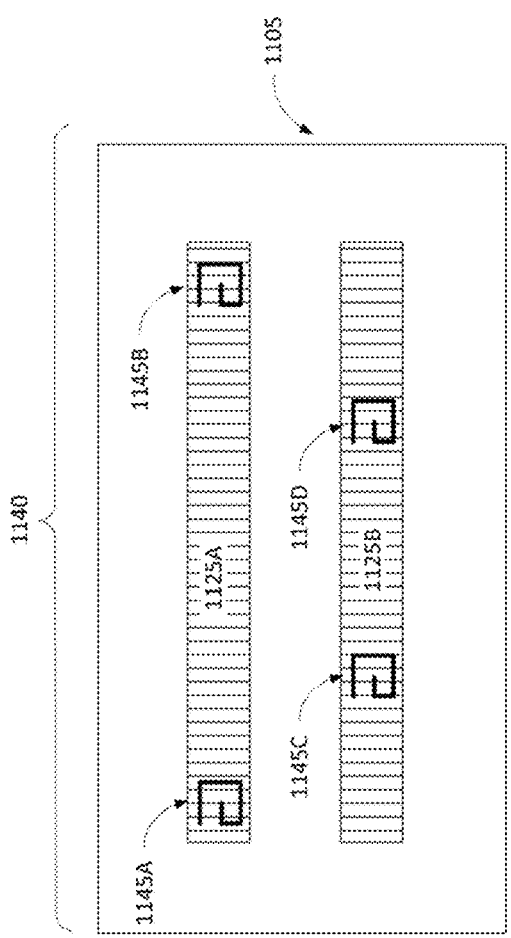

FIG. 11E illustrates an example of luminaire 1140 that includes a housing 1105, a first antenna 1145A, a second antenna 1145B, a third antenna 1145C, a fourth antenna 1145D, and light sources 1125A and 1125B. The housing 1105 is rectangular shaped, but may be other shapes, such as circular, hexagonal or the like. The four antennas 1145A-1145D may be positioned at different locations near the light sources 1125A and 1125B, and may be sized (e.g. have a diameter) that does not noticeably occlude light emitted by the light sources 1125A or 1125B. Each of the antennas 1145A-1145D may be separately coupled to an RFID reader, such as the RFID readers of FIGS. 1 and 3-6. For example, the separate antennas 1145A-1145D may be connected to the RFID reader in pairs, such as antenna 1145B may be paired with antenna 1145C, or in another arrangement.

While the antennas 1131-1145D of FIGS. 11A-11E, are shown as heavy dark lines in the figures as compared to the respective housings 1101-1104, it is envisioned that the antennas 1131-1145D may be transparent, or substantially transparent, in an actual implementation. For example, the antennas 1131-1145D may be formed from materials such as indium-tin-oxide, an extra-fine strand copper wire, nanowires, or the like.

Figure 11F:
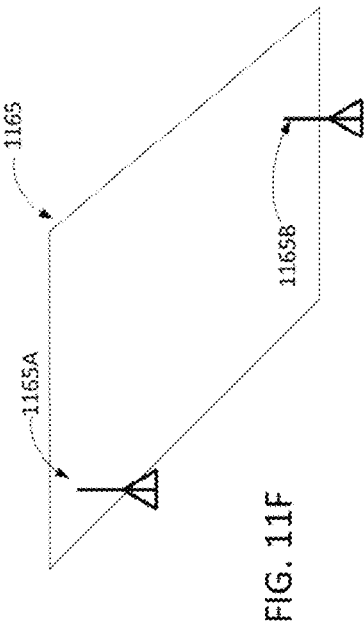

FIG. 11F illustrates yet another example of the integration of an antenna in a luminaire. In the FIG. 11F example, the antennas 1165A and 1165B may protrude out of the plane of the luminaire 1165, instead of on the traces of boards flush on a diffuser 1165. The antennas 1165A and 1165B may monopole antennas, dipole antennas, or the like, and be formed from materials such as indium-tin-oxide, an extra-fine strand copper wire, nanowires, or the like.

The foregoing examples of luminaires and the respective implementations of the luminaires are shown to illustrate only a few of the contemplated configurations. The following discussion explains at a high level functional components of the servers, such as 299 of FIG. 2, 277 of FIG. 3, 488 of FIG. 4 or 510 of FIG. 5.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files for the communication device ID codes and associated communication device positions obtained during commissioning. The software code is executable by the general-purpose computer that functions as the configuration server and/or that functions as a mobile device. In operation, the code may be stored within the server, such as 299 of FIG. 2, 277 of FIG. 3, 488 of FIG. 4 or 510 of FIG. 5, or a related data storage. At other times, however, the software code may be stored at other locations and/or transported for loading into the appropriate general-purpose computer system. Execution of such software code by a processor of the computer platform enables the platform to implement appropriate aspects of the location estimating/determining of the responsive RF devices, in essentially the manner performed in the implementations discussed and illustrated herein.

Figure 12:
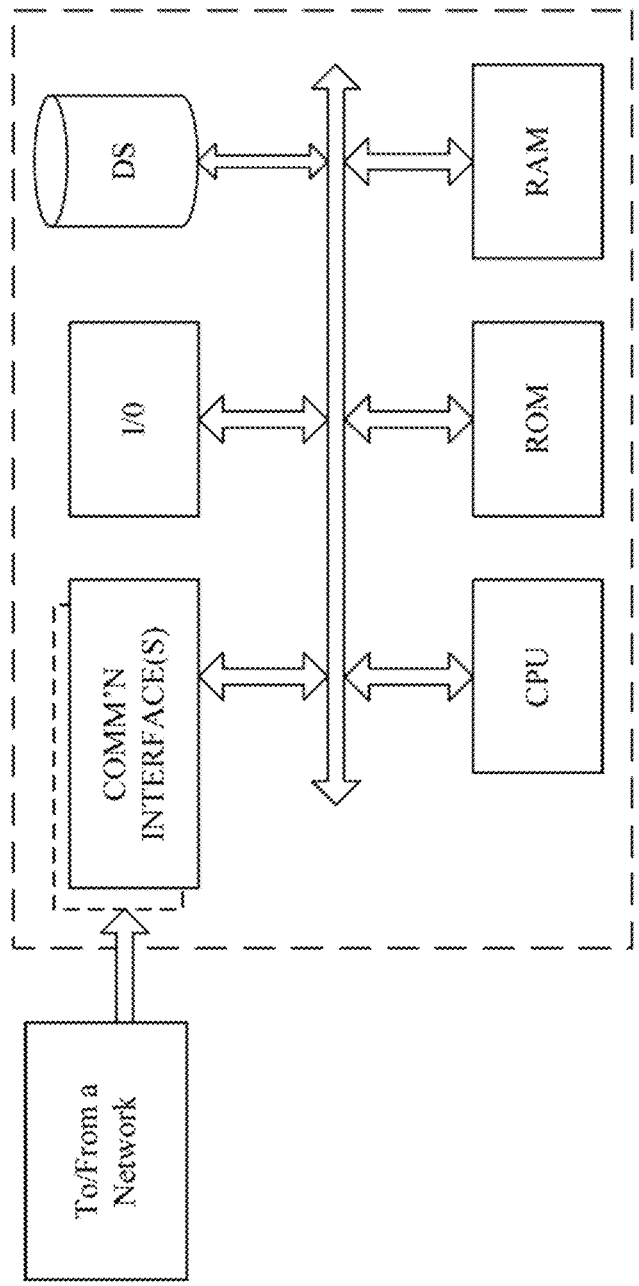

For purposes of further discussion, FIG. 12 shows a computer platform as an example of an implementation of the hardware for a server configured/programmed as an appropriate servers or network gateway, such as 299 of FIG. 2, 277 of FIG. 3, 488 of FIG. 4 or 510 of FIG. 5. The server computer includes a CPU for executing program instructions, such as the appropriate server application program(s). The computer server platform typically includes an internal communication bus, program storage, such as memories (ROM and RAM) and/or data storage DS, for various data files to be processed and/or communicated by the server, although the server often receives programming and data via network communications. It is believed that those skilled in the art are adequately familiar with the structure, programming and general operation of computer equipment, such as that shown in FIG. 12, and as a result, the drawing should be self-explanatory.

Hardware of a server computer (FIG. 12), for example (server/gateway/computing device 299 of FIG. 2, 277 of FIG. 3, 488 of FIG. 4 or 510 of FIG. 5), includes a data communication interface or input/output (I/O) for packet data communication. The server computer's central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications.

Figure 13:
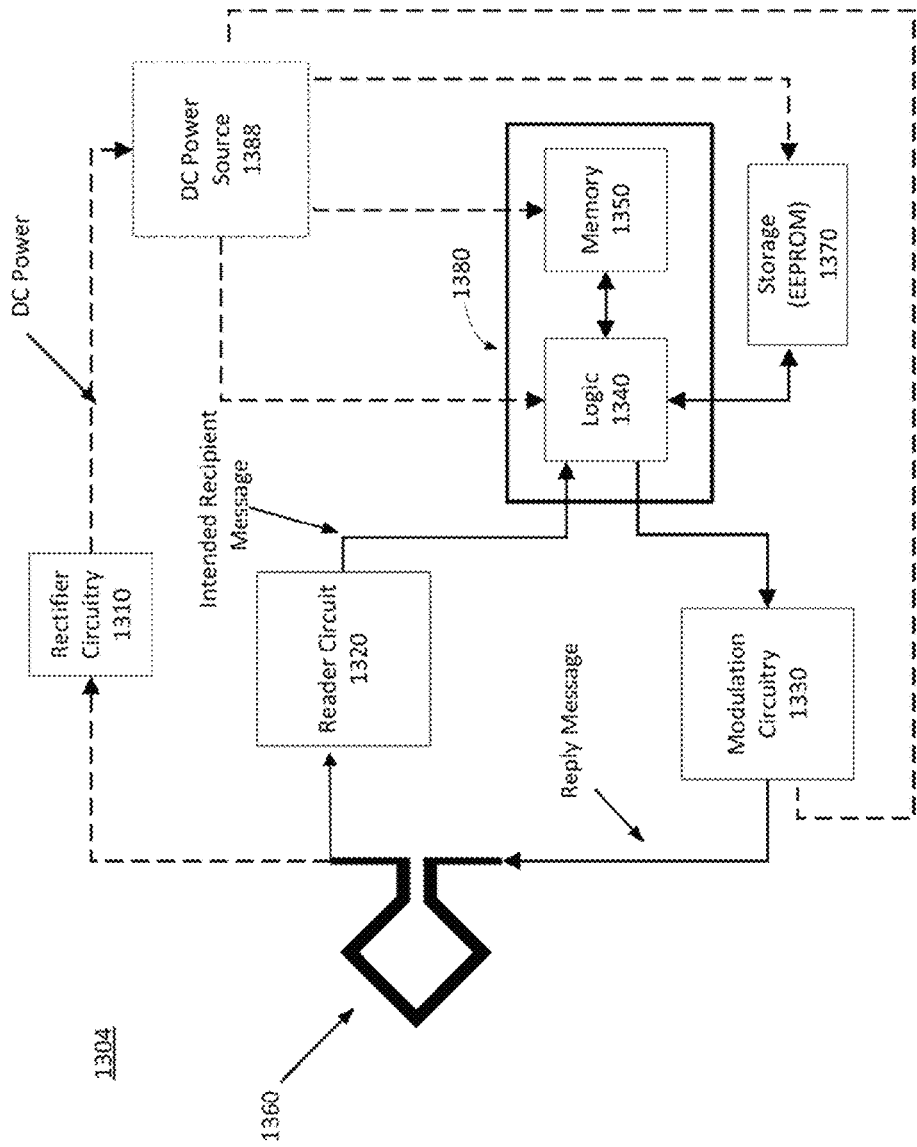
FIG. 13 is a functional block diagram of a passive RFID tag.

Reference is now made to FIG. 13, which schematically depicts an example of a responsive RF device, which may also be referred to as an RF-enabled asset tag 1304. FIG. 13 is a functional block diagram of an RFID device. Depending upon whether the responsive RFID device 1304 is an active tag or a passive tag, the responsive RFID device 1304 may have different types of components related to a power source in the case of an active tag or rectifying circuitry in the case of a passive tag implementation.

Radio frequency signal transmissions from one or more antennas of the lighting system examples described above with respect to FIGS. 1, 3-11D may be received by one or more tags 1304. When configured as a passive tag, responsive RFID device 1304 includes an antenna 1360, rectifier circuitry (e.g., a capacitor, diodes or the like) 1310, reader circuitry 1320, information processing circuitry 1380, a data storage 1370 (e.g., an electronically erasable programmable read-only memory (EEPROM))), and modulation circuitry 330.

The tag antenna 1360 is capable of both receiving radio frequency (RF) signals and of transmitting radio frequency signals. The tag antenna 1360 may be a loop antenna or similar antenna. When the antenna 1360 receives RF signals some of the energy in the RF signals is converted by the rectifier circuitry 1360 into direct current (DC) power. If the received signal has sufficient signal strength, the converted DC power is sufficient to supply power the other components of the passive tag 1304. For example, with sufficient DC power, the information processing circuitry 1380 may be powered for some interval. The received signal is input to the reader circuit 1320 which may be configured to process the input signal to output data representative of the intended recipient message. The information processing circuitry 1380 includes logic circuitry (or simply "logic") 1340 and a memory 1350. The memory 1350 may store an address of the tag and other information related to the tag 1304. Alternatively, the tag address and other information related to the tag 1304 may be stored in storage (EEPROM) 1370. The logic 1340 of information processing device 1380 may be configured to perform functions that include the processing of data received through the antenna 1360 utilizing the logic circuitry 1340 and transmitting information (e.g., an address of the tag 1304 retrieved from memory 1350 and the unique identifier of the luminaire antenna that transmitted the received signal) through the antenna 1360.

Functions performed by the information processing device 1380 may include determining that the received intended recipient message is addressed to the tag device 1304 by comparing the address in the intended recipient message to an address stored in memory 1350 of the intended recipient device 1304. After the logic 1340 retrieves the tag address from the memory 1350 or from storage 1370, the logic 1340 may be configured to generate a data packet that includes the tag address and the antenna identifier. The generated data packet may be forwarded to the modulation circuitry 1330 which generates a reply message that is transmitted from the tag 1304.

In addition, the information processing device 1380 may be configured to measure received signal strength indicator (RSSI) of a signal transmitted by an antenna in a luminaire as described above with reference to FIGS. 1 and 3-6. The RSSI measurement capabilities of the logic 1340 may be available to the passive tag.

If more processing capabilities are needed, the tag 1304 may be configured to receive DC power from a DC power source 1388. As an active tag, the logic 1340 may be configured to in response to receiving the intended recipient message, may perform functions such as those described with reference to FIG. 8B as well as FIGS. 8A and 9.

Figure 14:
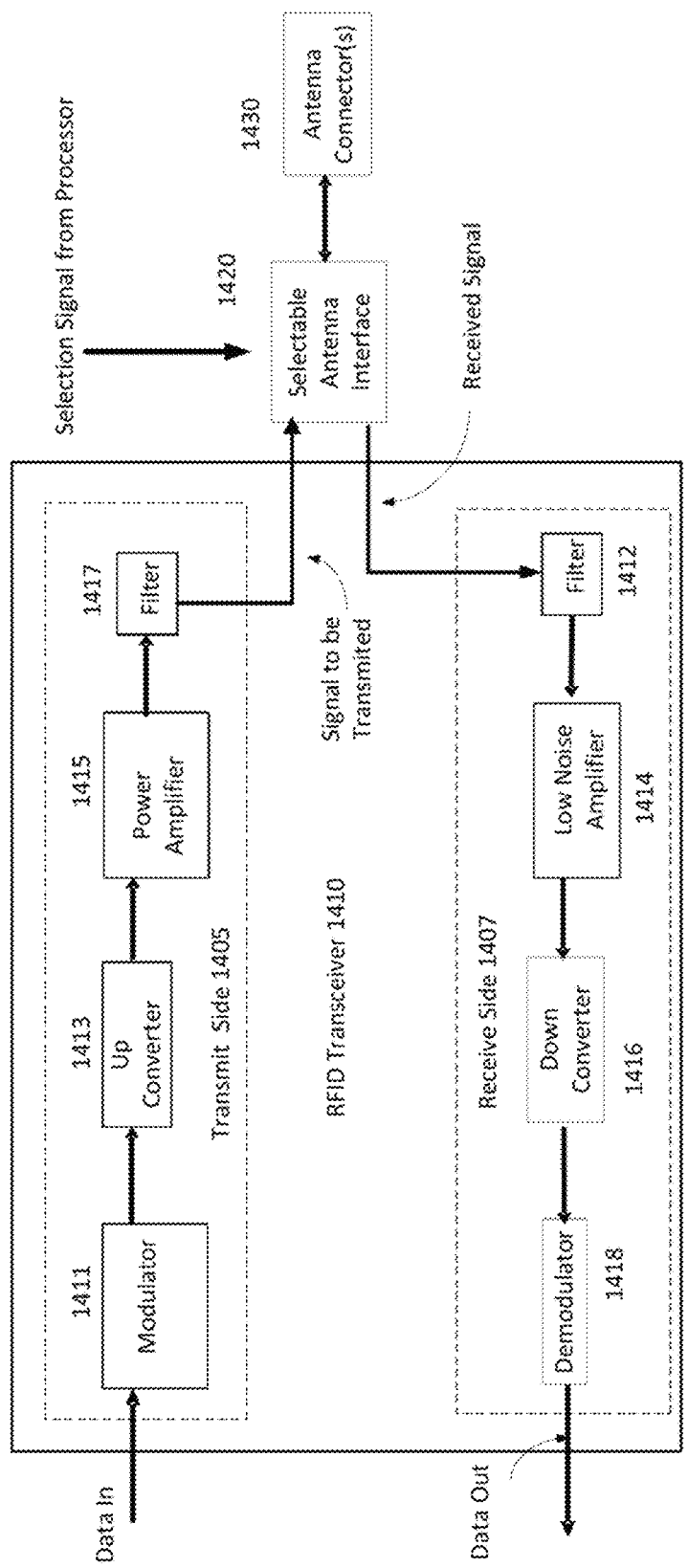
FIG. 14 is a functional block diagram of an RFID transceiver, suitable for use in the RFID reader example of FIG. 2.

Reference is now made to FIG. 14, which schematically depicts an example of an RFID schematic a reader processor configured to control operation of the radio frequency identification reader;

The selectable antenna interface 1420 is coupled to an RFID reader processor, such as processor 282 of FIG. 2. In addition, the selectable antenna interface 1420 is selectively coupled to each respective antenna of a number of antennas (not shown in this example) located within the space via the antenna connectors 1430. The selectable antenna interface 1420 may be a coupler, a circulator, or a switch, which couples a respective one or more of the antenna connectors 1430 to the RFID transceiver 1410. In response to a selection signal from the RFID reader processor, the selectable antenna interface 1420 may couple an antenna connector 1430 corresponding to the selected antenna (not shown).

The reader radio frequency transceiver 1410, for example, may be coupled to the reader processor and the selectable antenna interface 1420. The reader radio frequency transceiver 1410 may include a transmit side 1405 and a receive side 1407. The data input to the transmit side 1405 of the RFID transceiver 1410 may be packet data representing the intended recipient message and/or related information. The RFID transceiver 1410 is configured to emit a signal representing the intended recipient message and/or related information from an antenna selected from the number of antennas coupled via the antenna connectors 1430 to the selectable antenna interface 1420. The transmit side 1405 may include a modulator 1411, an up converter 1413, a power amplifier 1415, a transmit filter 1417. The transmit filter 1417 may be coupled to the selectable antenna interface 1420 to deliver the RF signals for transmission from the selected antenna.

The RFID transceiver 1410 is configured to receive reply messages in response to the signal emitted by the RFID transceiver 1410 and transmitted from the selected antenna. The received reply message may be in the form of a signal representing an identifier of the transmitting antenna and the address of the intended recipient responsive RFID device. The receive side 1407 may include a receive filter 1412, a low noise amplifier 1414, a down converter 1416 and a demodulator 1418. The respective components 1411-1418 perform signal processing functions according to their respective labels. For example, the modulator 1411 modulates the input data "Data In", and the power amplifier 1415 amplifies the signal output from the up converter 1413. In addition, the RFID transceiver 1410 is configured to receive reply messages in response to the emitted signal encompassing the intended recipient message. The received signal is filtered by the filter 1412, the low noise amplifier 1414 amplifies the low power signal output from filter 1412, and the demodulator 1418 demodulates the down converted signal output from the down converter 1416. The data output from the demodulator 1418 of the receive side 1407 may be data representative of the reply message transmitted by the responsive RF device that was the intended recipient of the transmitted intended recipient message.

The foregoing example is provided for purposes of illustration and understanding. Of course, other configurations and/or implementations of an RFID transceiver, a selectable antenna interface and antenna connectors may be used.

Aspects of methods of utilizing selected antennas from an array of antennas to transmit signal to and receive signals from a responsive RFID device, also referred to as a tag, by the system and process examples in FIGS. 1-9 described above may be embodied in programming, e.g. in the form of software, firmware, or microcode executable by an RFID reader, a responsive RFID device, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through networks that include the RFID readers and/or servers or network gateways described in the foregoing examples of FIGS. 1-14. Such communications, for example, may enable loading of the software from one computer or processor into another, for example, from a server, RFID reader or gateway computer in the examples described with reference to FIGS. 1-14. Thus, another type of media that may bear the software elements includes optical, electrical and electromagnetic waves, such as used across physical interfaces between networked devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible or non-transitory storage medium, a carrier wave medium or physical transmission medium. Non-volatile storage media include, for example, optical or magnetic disks, such as any of the storage hardware in any computer(s), portable user devices or the like, such as may be used to implement the server computer 510, the computer 520, the responsive devices 22, 142, 342 or RFID reader 12, 130, 400, 204, etc. shown in the drawings. Volatile storage media include dynamic memory, such as main memory of such a computer or other hardware platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge (the preceding computer-readable media being "non-transitory" and "tangible" storage media), a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render a computer system or a device into a special-purpose machine that is customized to perform the operations specified in the program instructions.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A lighting system, comprising:
a plurality of luminaires located within a space, wherein each luminaire of the plurality of luminaires includes:
a light source configured to provide general illumination light to the space, and
an antenna configured for wireless radio frequency communication within the space; and
a radio frequency identification reader, the radio frequency identification reader comprising:
a reader processor to control operation of the radio frequency identification reader;
a reader radio frequency transceiver coupled to the reader processor;
a selectable antenna interface coupled to the processor and the reader transceiver, the antenna interface being configured to selectively couple each antenna of the plurality of luminaires within the space to the reader transceiver; and
a data storage device storing a unique identifier for each antenna;
wherein the reader processor is configured to perform functions, including functions to, iteratively, for each respective one or more of the antennas in each of the luminaires:
control the selectable antenna interface to selectively couple the respective one or more antennas to the reader transceiver;
control the reader transceiver to transmit an intended recipient message from a selected antenna of the respective one or more antennas for reception by an intended recipient device, wherein the transmitted intended recipient message contains the unique identifier of the selected antenna and an address of the intended recipient device within the space;
in response to the transmitting of the intended recipient message, receive via at least one of the respective one or more antennas a reply message from the intended recipient device;
obtain a signal attribute of the received reply message; and
maintain a record in the data storage device for each iteration, the record including the obtained signal attribute in association with the unique identifier of the selected antenna and the intended recipient address.

2. The lighting system of claim 1, further comprising a server coupled to the data storage, wherein the server comprises a processor and memory, the memory storing programming instructions which upon execution by the server processor configures the server to perform functions, including functions to:
retrieve a respective first, second and third record from the data storage;

determine, using the obtained attribute in each of the respective first, second and third records, a distance measure of the intended recipient device from the selected antenna identified in each of the first, second and third records; and using the distance measures determined from each of the first, second and third records and known locations of the selected antennas of identified in the respective first, second and third records, calculate a position of the intended recipient device with respect to the selected antennas of identified in the respective first, second and third records.

3. The lighting system of claim 1, further comprising:
a responsive radio frequency device having an address matching the address contained in the intended recipient message, wherein the responsive radio frequency device comprises an antenna, modulation circuitry, and logic circuitry, and is configured to:
receive the intended recipient message via the antenna of the responsive radio frequency device;
determine, via the logic circuitry, that the received intended recipient message is addressed to the responsive radio frequency device by comparing the address in the intended recipient message to an address of the responsive radio frequency device; and
in response to the determination that the responsive radio frequency device is the intended recipient device, generate, by the modulation circuitry, the reply message including the intended recipient device address that is the address of the responsive radio frequency device.

4. The lighting system of claim 1, wherein the reply message further includes the unique identifier of the selected antenna.

5. The lighting system of claim 1, wherein when obtaining the signal attribute of the received reply message, the reader processor is further configured to perform functions, including functions to:
retrieve a received signal strength indication value corresponding to a measured received signal strength of the received reply message.

6. The lighting system of claim 1, wherein when obtaining the signal attribute the received reply message, the reader processor is further configured to perform functions, including functions to:
retrieve a time stamp corresponding to a time when the received reply message was received by the respective selected antenna.

7. The lighting system of claim 1, wherein when obtaining the signal attribute the received reply message, the reader processor is further configured to perform functions, including functions to:
retrieve a signal phase representation corresponding to a signal phase of the received reply message when received by the respective selected antenna.

8. A system, comprising:
a plurality of luminaires located within a space, wherein each luminaire of the plurality of luminaires includes:
a light source configured to provide general illumination light to the space, and
an antenna configured for wireless radio frequency communication within the space; and
a radio frequency identification reader, the radio frequency identification reader comprising:
a reader processor configured to control operation of the radio frequency identification reader; and
a reader radio frequency transceiver coupled to the reader processor, the reader transceiver configured to emit a signal to an antenna selected from the plurality of antennas, and receive reply messages in response to the emitted signal;
a selectable antenna interface coupled to the processor, the reader transceiver, and to each respective antenna of the plurality of luminaires within the space, the selectable antenna interface configured to:
in response to an antenna selection signal received from the reader processor, communicatively couple at least one selected antenna of the plurality of antennas to the reader transceiver, wherein each antenna has a unique identifier; and
a data storage device storing the unique identifier for each respective antenna of the plurality of antennas,
wherein the reader processor is further configured to determine an attribute of the received reply message usable in estimating a location within the space from which the received reply message was transmitted.

9. The system of claim 8, wherein the attribute of the received reply message is at least one of received signal strength, phase, or time difference of arrival.

10. The system of claim 8, wherein the radio frequency identification reader is collocated with one luminaire of the plurality of luminaires.

11. The system of claim 8, wherein the radio frequency identification reader is located remotely from the plurality of luminaires.

12. The system of claim 8, wherein:
the plurality of luminaires are a subset of a larger group of luminaires, and
each radio frequency identification reader being coupled to a server, wherein the server is configured to:
retrieve the determined attributes for the received reply messages, and
estimating the location within the space from which the received reply message was transmitted.

13. The system of claim 8, wherein each antenna of each respective luminaire of the plurality of luminaires is integrated into a diffuser of each respective luminaire.

14. A radio frequency identifier reader, comprising:
a reader processor configured to control operation of the radio frequency identification reader;
a selectable antenna interface coupled to the processor and to each respective antenna of a plurality of antennas located within the space,
a data storage device coupled to the reader processor, the data storage device configured to store a unique identifier for each respective antenna of the plurality of antennas and other data,
a reader radio frequency transceiver coupled to the reader processor and the selectable antenna interface,
wherein the reader transceiver is configured to:
emit a signal from an antenna selected from the plurality of antennas, and
receive reply messages in response to the emitted signal; and
wherein the selectable antenna interface is configured to:
in response to an antenna selection signal received from the reader processor, communicatively couple at least one selected antenna of the plurality of antennas to the reader transceiver.

15. A method, comprising:
during an iteration of an iterative process:
selecting an available antenna from a plurality of antennas as a currently active antenna, wherein each of the plurality of antennas is:
coupled to a respective luminaire of a plurality of luminaires located within a space,
assigned a unique identifier, and
upon selection of the currently active antenna in the current iteration, generating a message containing an address of an intended recipient and a unique identifier of the antenna selected as the currently active antenna;
transmitting, via a radio frequency (RF) transceiver coupled to the currently active antenna, the generated message into the space;
in response to the transmitted message, receiving via the currently active antenna a reply message from the intended recipient device;
determining a reply message attribute of the received reply message; and
storing in memory the determined reply message attribute and the unique identifier of the currently active antenna in association with the intended recipient address, wherein upon completion of the iterative process the memory contains records of a plurality of determined reply message attributes corresponding to each respective antenna;
determining a location within the space from which the received reply message was transmitted based on the determined reply message attribute; and
selecting another antenna from the plurality of antennas to replace the currently active antenna in a next iteration of the iterative process.

16. The method of claim 15, further comprising:
after completion of the iterative process, retrieving from the memory the records of a plurality of determined reply message attributes corresponding to the intended recipient address.

17. The method of claim 15, wherein:
the determined reply message attributes are a received signal strength indication value corresponding to a measured received signal strength of the received reply message from the intended recipient address at a respective antenna identified in the records, and
the step of determining a location with the space comprises:
determining respective distances from each respective antenna to the location of the space using the respective received signal strength indication values, and
applying trilateration techniques to the determined respective distances to determine the location within the space from which the reply message was transmitted.

18. The method of claim 15, wherein:
the determined reply message attributes are time stamps corresponding to a time when the received reply message was received at a respective antenna identified in the records, and
the step of determining a location with the space comprises:
determining respective distances from each respective antenna to the location of the space using the respective time stamps, and
applying trilateration techniques to the determined respective distances to determine the location within the space from which the reply message was transmitted.

19. The method of claim 15, wherein:
the determined reply message attributes are signal phase representations corresponding to a signal phase of the received reply message at a respective antenna identified in the records, and
the step of determining a location with the space comprises:
determining respective distances from each respective antenna to the location of the space using the respective signal phase representations, and
applying trilateration techniques to the determined respective distances to determine the location within the space from which the reply message was transmitted.

20. A lighting system, comprising:
one or more luminaires, each luminaire comprising a light source configured to provide general illumination in a space;
radio frequency identification (RFID) antennas incorporated in the one or more luminaires;
an RFID reader transceiver coupled to the RFID antennas; and
an RFID reader processor coupled to the RFID transceiver, wherein:
the RFID reader processor is configured to cause the RFID reader transceiver to transmit at least one RFID intended recipient message from at least one of the antennas and to receive a responsive RFID reply message from a recipient device within the space via a plurality of the antennas; and
the RFID reader processor is further configured to:
determine a signal attribute of a reply message signal received via each antenna of the plurality of antennas; and
process the determined signal attributes of the reply message signals received via the plurality of antennas and information about locations of the plurality of antennas to estimate a position of the recipient device within the space.

21. The lighting system of claim 20, wherein:
at least two of the RFID antennas are collocated in one luminaire of the one or more luminaires.

22. The lighting system of claim 20, further comprising:
more than one luminaire, wherein each luminaire has at least one antenna of the RFID antennas collocated with the luminaire.

23. A method, comprising:
transmitting, by a radio frequency identification (RFID) transceiver coupled to a plurality of RFID antennas in one or more luminaires in a lighting system, an RFID intended recipient message from at least one of the antennas,
receiving a responsive RFID reply message signal from a recipient device within the space via a plurality of the antennas;
determining by the RFID processor a signal attribute of the reply message signal received via each antenna of the plurality of the antennas; and
processing the determined signal attributes of the reply message signals received via the plurality of antennas and information about locations of the plurality of antennas to estimate a position of the recipient device within the space.

\* \* \* \* \*